US009984468B2

(12) United States Patent
Kasahara

(10) Patent No.: US 9,984,468 B2
(45) Date of Patent: May 29, 2018

(54) INFORMATION PROCESSING DEVICE AND METHOD FOR RECOGNISING AN IMAGE

(71) Applicant: Sony Corporation, Tokyo (JP)

(72) Inventor: Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 60 days.

(21) Appl. No.: 14/386,510

(22) PCT Filed: Feb. 8, 2013

(86) PCT No.: PCT/JP2013/053009
§ 371 (c)(1),
(2) Date: Sep. 19, 2014

(87) PCT Pub. No.: WO2013/145883
PCT Pub. Date: Oct. 3, 2013

(65) Prior Publication Data
US 2015/0070390 A1 Mar. 12, 2015

(30) Foreign Application Priority Data

Mar. 26, 2012 (JP) .................. 2012-069713

(51) Int. Cl.
*G09G 5/377* (2006.01)
*G06T 7/00* (2017.01)
(Continued)

(52) U.S. Cl.
CPC .......... *G06T 7/0042* (2013.01); *G06F 3/0304* (2013.01); *G06F 3/0487* (2013.01);
(Continued)

(58) Field of Classification Search
CPC .......... G06F 3/01; G06F 3/0346; G06F 3/048; G06K 9/00671; G06K 9/2063;
(Continued)

(56) References Cited

U.S. PATENT DOCUMENTS 8,731,301 B1 * 5/2014 Bushman ............. G06K 9/2063
235/375
8,913,171 B2 * 12/2014 Roberts ............. H04N 21/4126
348/333.02
(Continued)

FOREIGN PATENT DOCUMENTS

JP 2003-256876 A 9/2003
JP 2007-193403 A 8/2007

OTHER PUBLICATIONS

Internatinal Search Report mailed in International Publication PCT/JP2013/053009 dated Mar. 26, 2013.

*Primary Examiner* — Jin-Cheng Wang
(74) *Attorney, Agent, or Firm* — Chip Law Group

(57) ABSTRACT

There is provided an information processing device including a captured image information acquisition portion which acquires captured image information corresponding to a captured image, a displayed image information acquisition portion which acquires displayed image information corresponding to a first image displayed on a display screen, and an object recognition portion which detects the position and the posture of the first image in the captured image using the displayed image information and the captured image information.

18 Claims, 15 Drawing Sheets

(51) Int. Cl.
*G06K 9/00* (2006.01)
*G06T 19/00* (2011.01)
*G06F 3/0487* (2013.01)
*G06F 3/14* (2006.01)
*G06F 3/03* (2006.01)
*G06T 7/73* (2017.01)
*H04N 21/41* (2011.01)
*H04N 1/00* (2006.01)
*A63F 13/26* (2014.01)

(52) U.S. Cl.
CPC ....... *G06F 3/1454* (2013.01); *G06K 9/00671* (2013.01); *G06K 9/00993* (2013.01); *G06T 7/73* (2017.01); *G06T 19/006* (2013.01); *A63F 13/26* (2014.09); *A63F 2300/403* (2013.01); *G06T 2207/10004* (2013.01); *G06T 2207/20221* (2013.01); *G09G 2340/02* (2013.01); *H04N 1/00347* (2013.01); *H04N 21/4126* (2013.01)

(58) Field of Classification Search
CPC ......... G06T 19/006; G06T 2207/10004; G06T 2207/20221; G06T 7/0042
USPC .......................................................... 345/633
See application file for complete search history.

(56) References Cited

U.S. PATENT DOCUMENTS

| | | | |
|---|---|---|---|
| 2007/0047943 A1* | 3/2007 | Seo | G03B 17/02 396/141 |
| 2008/0215979 A1* | 9/2008 | Clifton | G06F 17/30017 715/716 |
| 2011/0285704 A1* | 11/2011 | Takeda | A63F 13/54 345/419 |
| 2012/0008865 A1* | 1/2012 | Wu | G06K 9/3258 382/182 |
| 2012/0026166 A1* | 2/2012 | Takeda | A63F 13/211 345/419 |
| 2012/0033876 A1* | 2/2012 | Momeyer | G06F 17/30781 382/165 |
| 2012/0150639 A1* | 6/2012 | Li | G06Q 30/0251 705/14.49 |
| 2012/0185886 A1* | 7/2012 | Charania | H04N 21/4312 725/2 |
| 2012/0243732 A1* | 9/2012 | Swaminathan | G06T 7/2033 382/103 |
| 2013/0246448 A1* | 9/2013 | Sa | G06F 17/30873 707/758 |
| 2014/0033250 A1* | 1/2014 | Kennedy | G06F 17/3079 725/32 |
| 2015/0134739 A1* | 5/2015 | Gibbon | H04L 65/403 709/204 |

* cited by examiner

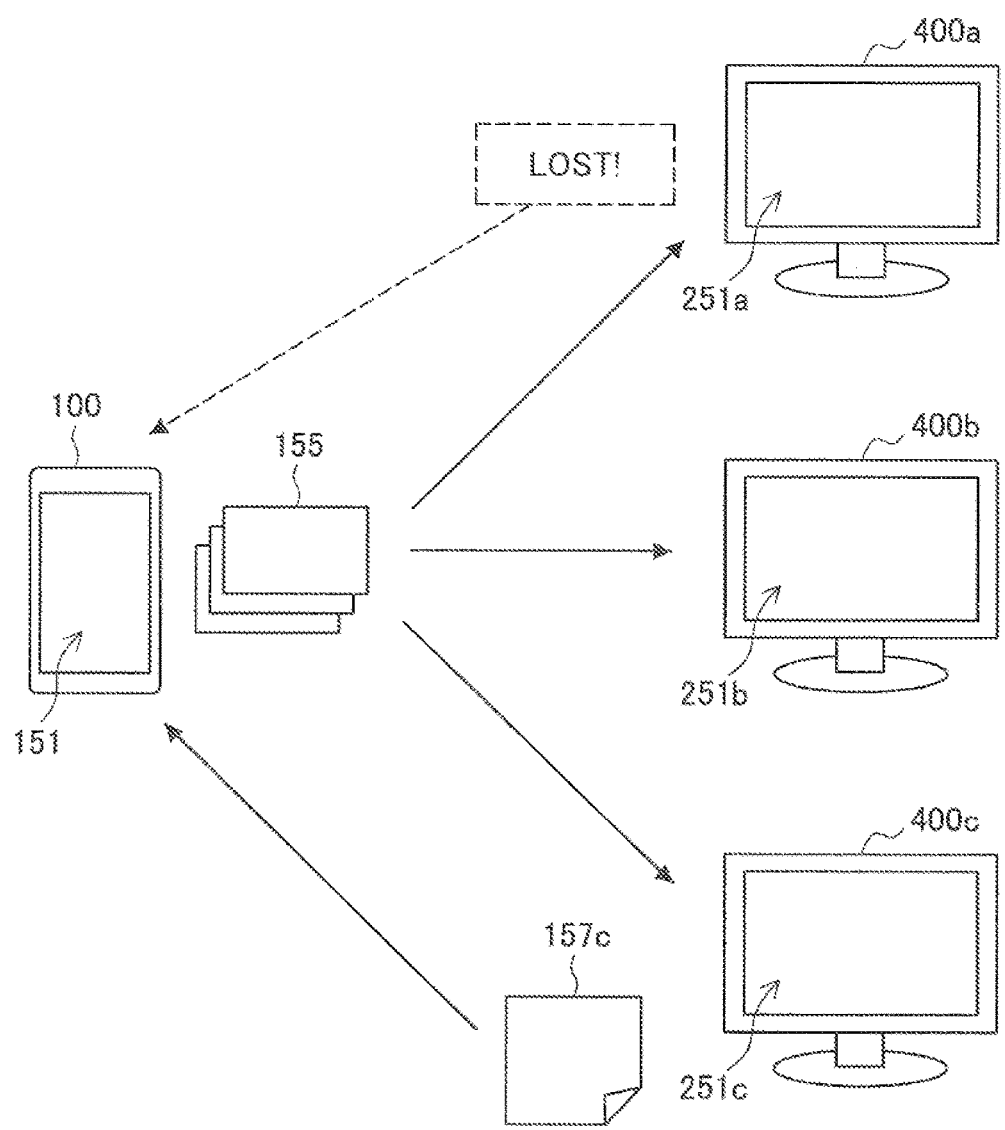

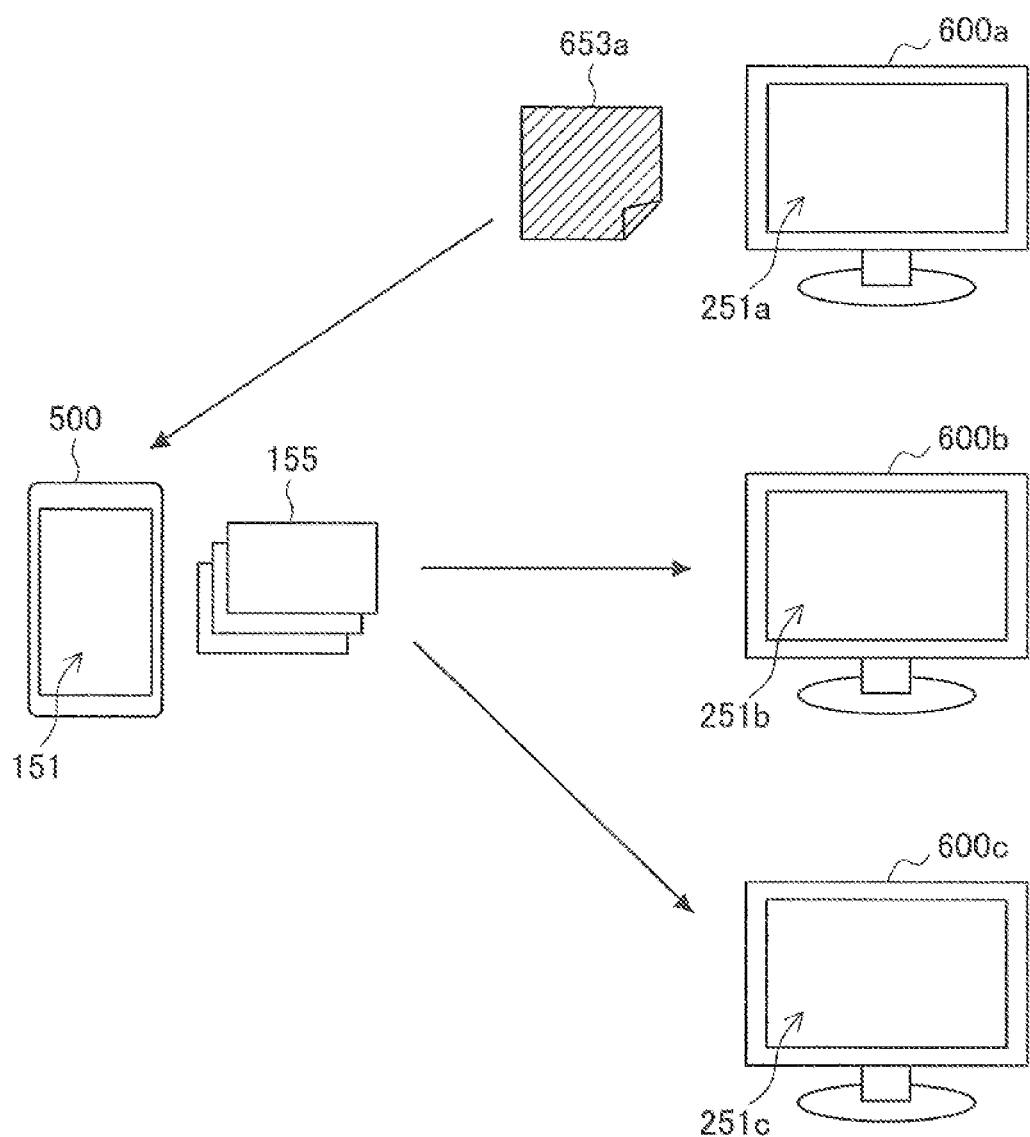

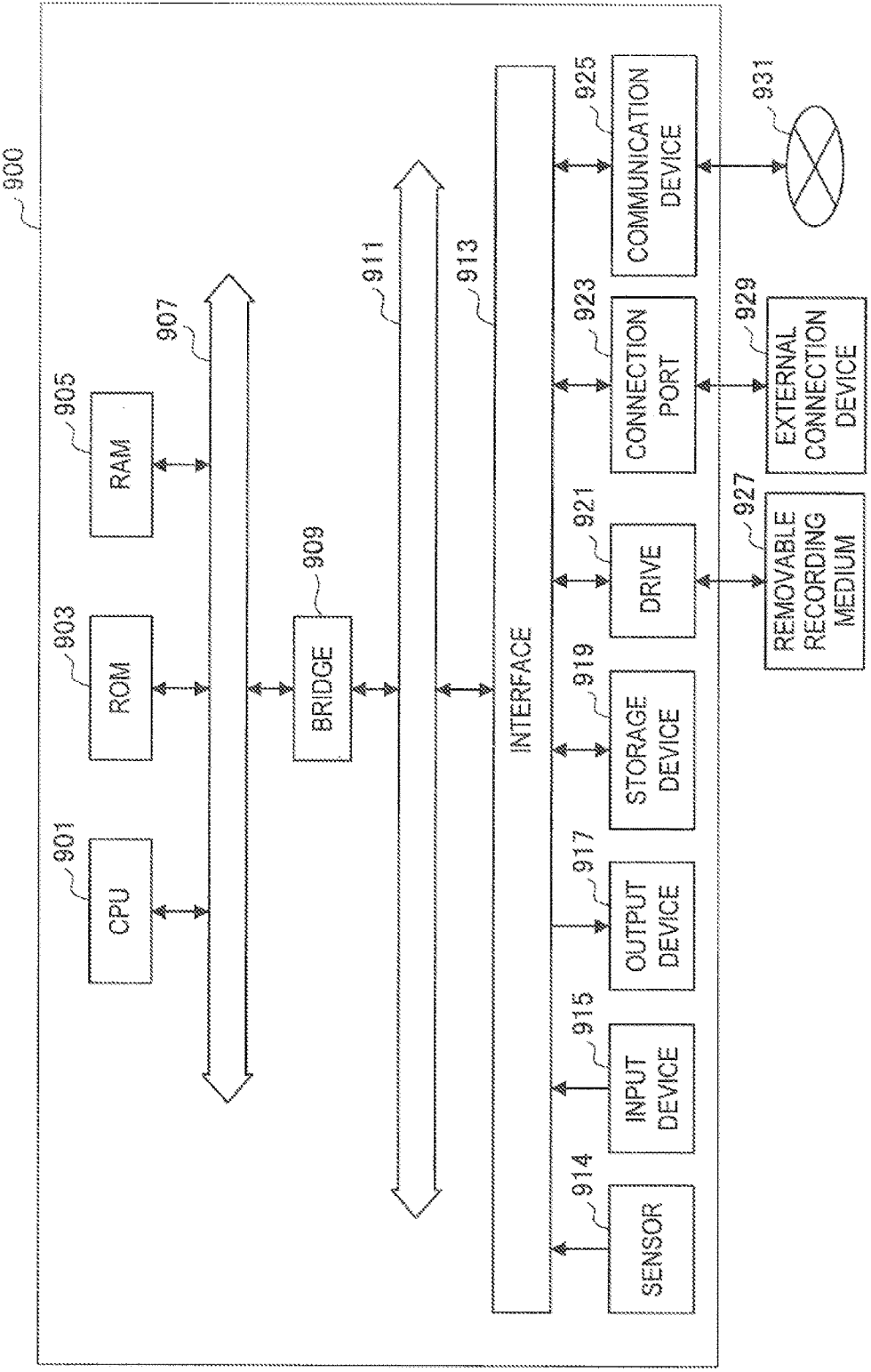

INFORMATION PROCESSING DEVICE AND METHOD FOR RECOGNISING AN IMAGE

CROSS-REFERENCE TO RELATED APPLICATION

The present application is a national phase entry under 35 U.S.C. § 371 of International Application No. PCT/JP2013/053009 filed Feb. 8, 2013, published on Oct. 3, 2013 as WO 2013/145883 A1, which claims priority from Japanese Patent Application No. JP 2012-069713, filed in the Japanese Patent Office on Mar. 26, 2012.

TECHNICAL FIELD

The present disclosure relates to an information processing device, an information processing method, and a program.

BACKGROUND ART

In recent years, the progress of an image recognition technique has allowed recognition of various objects contained in images in which an image of a real space is captured, for example, with the positions and the postures of the objects. The object recognition technique has been utilized for, for example, a technique referred to as Augmented Reality (AR) including superimposing additional information onto the image of the real space, and then presenting the resultant image to a user and the like. As an example of the AR technique, Patent Literature 1 describes a technique including superimposing an image of a virtual object imitating a real object, such as furniture, onto an image of a real space, and then presenting the resultant image to thereby facilitate a trial of the arrangement of the furniture or the like.

CITATION LIST

Patent Literature

Patent Literature 1: JP 2003-256876A

SUMMARY OF INVENTION

Technical Problem

When the AR technique described above is utilized, an image of another device contained in an image in which an image of a real space is captured can be operated. However, a load of performing processing of recognizing an image of another device contained in an image with a terminal device, for example, is high. It is still hard to say that a technique of reducing the load is sufficiently proposed.

Thus, the present disclosure proposes novel and improved information processing device, information processing method, and program which allow a reduction in a load of the processing of recognizing an image of another device displayed in an image.

Solution to Problem

According to the present disclosure, there is provided an information processing device including a captured image information acquisition portion which acquires captured image information corresponding to a captured image, a displayed image information acquisition portion which acquires displayed image information corresponding to a first image displayed on a display screen, and an object recognition portion which detects the position and the posture of the first image in the captured image using the displayed image information and the captured image information.

According to the present disclosure, there is provided an information processing method including acquiring captured image information corresponding to a captured image, acquiring displayed image information corresponding to a first image displayed on a display screen, and detecting the position and the posture of the first image in the captured image using the displayed image information and the captured image information.

According to the present disclosure, there is provided a program for causing a computer to realize a function of acquiring captured image information corresponding to a captured image, a function of acquiring displayed image information corresponding to a first image displayed on a display screen, and a function of detecting the position and the posture of the first image in the captured image using the displayed image information and the captured image information.

According to the above-described configuration, the position and the posture of the first image displayed on the display screen in the captured image are detected using the information corresponding to the first image. More specifically, the object recognition of the captured image containing the first image can be performed after acquiring the information corresponding to the first image beforehand. Therefore, the processing load of the object processing can be reduced.

Advantageous Effects of Invention

As described above, according to the present disclosure, the load of the processing of recognizing an image of another device displayed in an image can be reduced.

BRIEF DESCRIPTION OF DRAWINGS

FIG. 6B is a view for explaining the device configuration of the second embodiment of the present disclosure.

FIG. 9C is a view for explaining the device configuration of the third embodiment of the present disclosure.

FIG. 12 is a block diagram for explaining the hardware configuration of an information processing device.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description is given in the following order.
1. First Embodiment
   1-1. Outline
   1-2. Device configuration
   1-3. Processing flow
   1-4. Image information acquisition timing
2. Second Embodiment
   2-1. Device configuration
   2-2. Processing flow
3. Third Embodiment
   3-1. Device configuration
   3-2. Processing Flow
4. Supplement
(1. First Embodiment)
(1-1. Outline)

First, the outline of a first embodiment of the present disclosure is described with reference to FIG. 1. The outline similarly applies also to other embodiments of the present disclosure.

Figure 1:
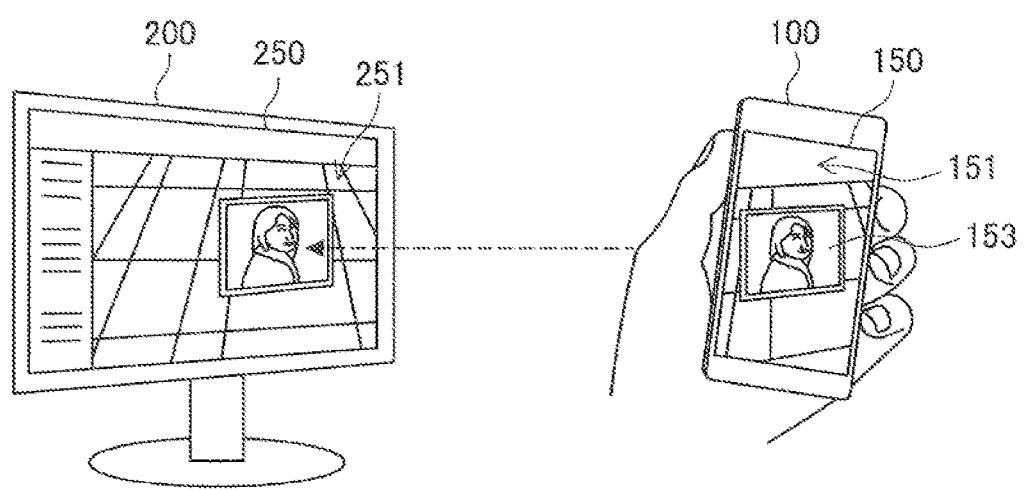
FIG. 1 is a view for explaining the outline of a first embodiment of the present disclosure.

FIG. 1 is a view for explaining the outline of this embodiment. When FIG. 1 is referred to, this embodiment relates to a terminal device 100 and a display device 200. The terminal device 100 acquires a captured image of a real space containing the display device 200, and then displays an image 151 on a display portion 150 based on the captured image. The terminal device 100 has a function of recognizing an object contained in the captured image and can utilize the object recognition result of the captured image when displaying the image 151 as described later.

On the other hand, the display device 200 has a display screen 250, and an image 251 is displayed on the display screen 250. Since the display device 200 is contained in the captured image acquired by the terminal device 100, the image 251 displayed on the display screen 250 is also contained in the captured image. The terminal device 100 recognizes the image 251 from the captured image, and then displays a virtual image 153 corresponding to the image 251 in the image 151. The virtual image 153 may be one in which the image 251 contained in the captured image is drawn as it is or one which is re-drawn utilizing the object recognition result of the captured image.

Herein, the terminal device 100 is mainly a device which is held and operated by a user, such as a cellular phone (smartphone), a tablet personal computer (PC), or a portable game machine or media player, for example. The display device 200 is mainly a stationary device, such as a television set, a desktop or notebook PC, or a PC monitor, for example. However, the embodiment of the present disclosure is not limited to these examples. As another example, both the terminal device 100 and the display device 200 may be smartphones.

As described above, the terminal device 100 has a function of recognizing the object contained in the captured image. In the example illustrated in the figure, the terminal device 100 recognizes the image 251 contained in the captured image. Therefore, for example, the terminal device 100 can acquire an operation to the virtual image 153 in the image 151, and then can change the virtual image 153 in the same manner as in the case where the same operation is performed to the real image 251.

For example, the terminal device 100 can assign the same functions as those of GUI (Graphical User Interface) components (a button, a link, a scroll bar, and the like) of the image 251 to the GUI components contained in the virtual image 153 by converting the coordinates on the display portion 150 to the coordinates on the display screen 250. In this case, when a user performs an operation of pressing down, tapping, dragging, flicking, or the like to the GUI components contained in the virtual image 153 through a touch panel provided on the display portion 150, the virtual image 153 changes in the same manner as in the case where the same operation is performed to the GUI components of the image 251.

However, the processing of detecting the position and the posture of the image 251 contained in the captured image is processing with a relatively high load. Since the image 251 changes according to the operation state of the display device 200, the reproduction state of contents, and the like, for example, it is not easy to recognize the image 251 by static data prepared beforehand. Therefore, it is sometimes required to search for the image 251 using enormous amount of data on the network, for example. The load generated by performing such processing is not desirable from the viewpoint of the performance of the terminal device 100, for example. Then, the embodiment of the present disclosure proposes a technique of reducing the load of the processing of recognizing the image 251 from the captured image of the terminal device 100.

(1-2. Device Configuration)

Figure 2:
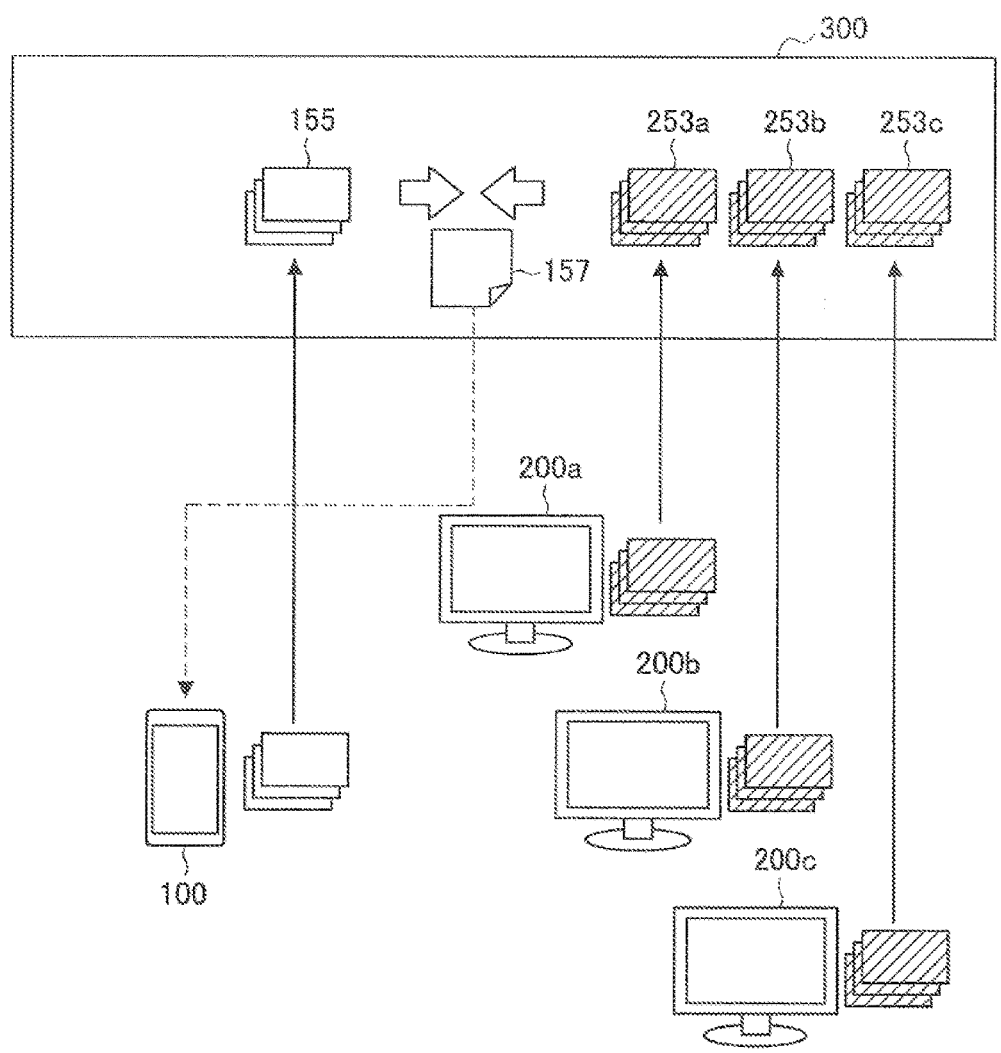
FIG. 2 is a view for explaining the device configuration of the first embodiment of the present disclosure.
Figure 3:
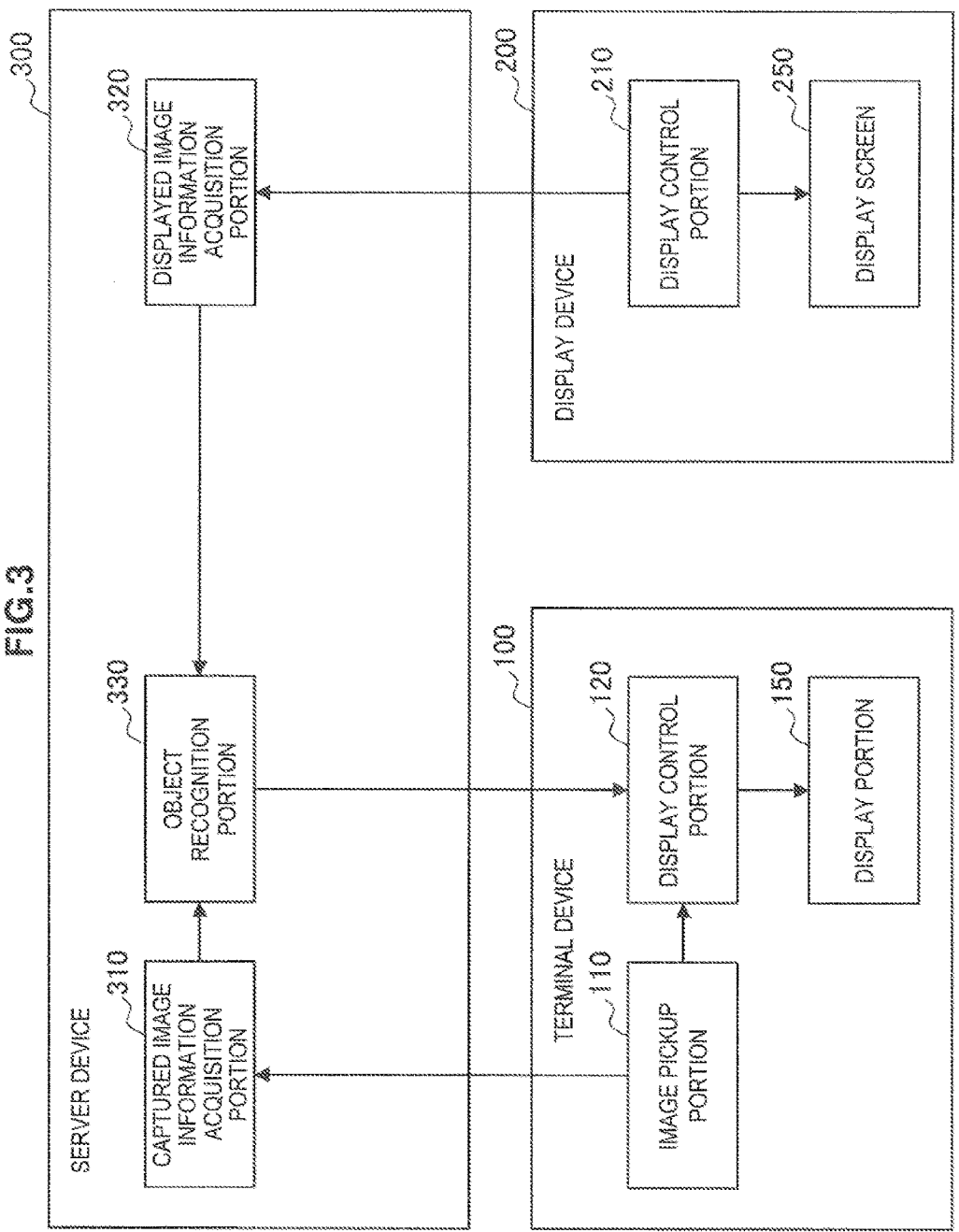
FIG. 3 is a schematic block diagram showing the functional configuration of a system according to the first embodiment of the present disclosure.

Next, the device configuration of the first embodiment of the present disclosure is described with reference to FIG. 2 and FIG. 3. FIG. 2 is a view for explaining the device configuration of this embodiment. FIG. 3 is a schematic block diagram showing the functional configuration of a system according to this embodiment. For simplicity, in FIG. 3, a plurality of display devices 200a to 200c illustrated in FIG. 2 are represented by a single display device 200.

When FIG. 2 is referred to, the device configuration of this embodiment contains the terminal device 100, display devices 200a to 200c, and a server device 300 (one example of an information processing device). The number of the display devices 200 may not be 3 as in the example illustrated in the figure and may be 1, 2, or 4 or more. As described above with reference to FIG. 1, even when the number of the display devices 200 is 1, the load of the processing of recognizing the image 251 contained in the captured image is relatively high. As in the example illustrated in the figure, when the plurality of display devices 200 are present, the load of the processing of recognizing the image 251 may be higher.

The server device 300 may not always be realized by a single device. For example, the function of the server device may be realized by the cooperation of resources of a plurality of devices through a network.

In the example illustrated in the figure, the terminal device 100 transmits captured image information 155 corresponding to the captured image to the server device 300. Herein, the captured image information 155 may be image data of the captured image itself but is not limited thereto. The captured image information 155 may be one which is adapted to be used for the object recognition processing in the server device 300 described later and, for example, may be compressed image data, a data array of feature points for use in the object recognition, or the like.

On the other hand, the display devices 200a to 200c transmit displayed image information 253a to 253c corresponding to the image 251 displayed on the display screens 250 of the display devices 200a to 200c, respectively, to the server device 300. Herein, the displayed image information 253a to 253c may be the image data itself of the image 251 but are not limited thereto. The displayed image information 253a to 253c may be those which are adapted to be used for the object recognition processing in the server device 300 described later and, for example, may be compressed image data, a data array of feature points for use in the object recognition, or the like.

The displayed image information 253a to 253c may not always be the same kind of information as the captured image information 155. For example, the captured image information 155 may be the image data itself of the captured image and the displayed image information 253a to 253c may be a data array of feature points. The display devices 200a to 200c may not always transmit the same kind of displayed image information 253a to 253c. For example, the displayed image information 253a may be the image data itself of the image 251a and the displayed image information 253b and 253c may be data arrays of feature points. In this case, the server device 300 may convert the displayed image information 253a to the same data array of feature points as those of the displayed image information 253b and 253c for use.

The server device 300 performs the object recognition processing using the captured image information 155 acquired from the terminal device 100 and the displayed image information 253a to 253c acquired from the display devices 200a to 200c. It is judged by this processing whether the image 251 displayed on any one of the display devices 200a to 200c is contained in the captured image of the terminal device 100. When the image 251 is contained in the captured image, the position and the posture are also detected. The server device 300 transmits a recognition result information 157 including information showing the position and the posture of the detected image 251 to the terminal device 100. The terminal device 100 displays the virtual image 153 in the image 151 using the recognition result information 157.

(Functional Configuration of Terminal Device)

The configuration of the terminal device 100 is further described with reference to FIG. 3. The terminal device 100 contains an image pickup portion 110, a display control portion 120, and the display portion 150.

The image pickup portion 110 is realized by an image pickup device built in or connected to the terminal device 100, for example, and acquires a captured image. The image pickup portion 110 may output the captured image as a dynamic image or may output the same as a still image. As described above, the image 251 to be displayed on the display screen 250 of the display device 200 is contained in the captured image. The image pickup portion 110 provides the generated captured image to the display control portion 120 and also transmits the captured image information 155 corresponding to the captured image to the server device 300.

Although not illustrated, the terminal device 100 may further contain a processing circuit for use in generating the captured image information 155 from the image data of the captured image, a communication device for transmitting the captured image information 155, and the like.

The display control portion 120 is realized by, for example, the operation of a central processing unit (CPU), a random access memory (RAM), and a read only memory (ROM) of the terminal device 100 according to a program stored in a storage device or a removable storage medium. The display control portion 120 displays the image 151 on the display portion 150 based on the image data of the captured image provided from the image pickup portion 110. As described above, the virtual image 153 corresponding to the image 251 recognized from the captured image is contained in the image 151. The display control portion 120 receives the recognition result information 157 from the server device 300 through a communication device (not illustrated). The information on the position and the posture of the image 251 may be contained in the recognition result information 157. Moreover, information on the contents of the image 251 may be contained in the recognition result information 157. The display control portion 120 may display the virtual image 153 utilizing the recognition result information 157.

The display portion 150 is realized by a liquid crystal display (LCD), an organic electroluminescence display, or the like which is possessed by the terminal device 100 as an output device or which is connected to the terminal device 100 as an external connection device, for example. The display portion 150 is not always limited to a flat display and may be a head mount display (HMD), for example. The display portion 150 displays the image 151 according to the control of the display control portion 120.

(Functional Configuration of Display Device)

Then, the configuration of the display device 200 is further described with reference to FIG. 3. The display device 200 contains the display control portion 210 and the display screen 250.

The display control portion 210 is realized by the operation of a CPU, a RAM, and a ROM of the display device 200 according to a program, for example. The display control portion 210 displays an image stored in a storage of the display device 200 or an image received by the display device 200 using a communication device (not illustrated) as the image 251 on the display screen 250. The display control portion 210 transmits the displayed image information 253 corresponding to the image 251 to the server device 300.

Although not illustrated, the display device 200 may further contain a processing circuit for use in generating the displayed image information 253 from the image data of the displayed image, a communication device for transmitting the displayed image information 253, and the like.

The display screen 250 is realized by a display, such as an LCD or an organic EL display, which is possessed by the terminal device 200 as an output device, for example. The display screen 250 displays the image 251 according to the control of the display control portion 210.

(Functional Configuration of Server Device)

Then, the configuration of the server device 300 is further described with reference to FIG. 3. The server device 300 contains a captured image information acquisition portion 310, a displayed image information acquisition portion 320, and an object recognition portion 330. These portions are all realized by the operation of a CPU, a RAM, and a ROM of the server device 300 according to a program, for example.

The captured image information acquisition portion 310 acquires the captured image information 155 transmitted from the terminal device 100 through a communication device (not illustrated). As described above, the captured image information 155 corresponds to the captured image acquired by the terminal device 100. The captured image information 155 may be image data themselves of the captured image, compressed image data, a data array of feature points for use in the object recognition, or the like, for example. The captured image information acquisition portion 310 provides the acquired captured image information 155 to the object recognition portion 330.

The displayed image information acquisition portion 320 acquires the displayed image information 253 transmitted from the display device 200 through a communication device (not illustrated). As described above, the displayed image information 253 corresponds to the image 251 displayed by the display device 200. The displayed image information 253 may be image data themselves of the captured image, compressed image data, a data array of feature points for use in the object recognition, or the like, for example. The displayed image information acquisition portion 320 provides the acquired displayed image information 253 to the object recognition portion 330.

The object recognition portion 330 recognizes an object contained in the captured image using the captured image information 155 provided from the captured image information acquisition portion 310. For example, the object recognition portion 330 compares a set of the feature points extracted from the captured image with the shape of the object defined by model data. The object recognition portion 330 may compare image data, such as a symbol mark or a text label defined by model data, with the captured image. Furthermore, the object recognition portion 330 may compare the amount of the features of the known object image defined by model data with the amount of the features extracted from the captured image.

The model data includes data defining the shape of each object, image data, such as a predetermined symbol mark or a text label attached to each object, data of the feature amount set extracted from the known image about each object, or the like. The model data are acquired from a model DB stored in a storage device, for example. Or, the model data may be acquired from a network through a communication device (not illustrated).

As described above, the object recognition portion 330 recognizes the image 251 contained in the captured image. The recognition of the image 251 may be performed by searching the contents of the image 251, for example. For example, when the image 251 is a web page displayed on a browser, the object recognition portion 330 acquires a uniform resource locator (URL) of the Web page and a uniform resource identifier (URI) showing the operation state thereof. When it is supposed that no information is provided from the display device 200, the object recognition portion 330 needs to recognize the above-described information only based on the contents of the captured image. In this case, the recognition processing load becomes heavy and also the recognition accuracy also decreases.

Therefore, in this embodiment, the object recognition portion 330 acquires information on the contents of the image 251 described above using the displayed image information 253 provided from the displayed image information acquisition portion 320. With respect to the displayed image information 253, the object recognition portion 330 can easily acquire the information on the contents of the image 251 by the use of the displayed image information 253 which is the information provided from the display device 200 itself which displays the image 251. Therefore, the object recognition portion 330 can recognize the image 251 with a lower processing load and with higher accuracy.

The object recognition portion 330 transmits the object recognition result described above to the terminal device 100 as the recognition result information 157 through a communication device (not illustrated). The recognition result information 157 includes information showing objects appearing (contained) in the captured image and the positions and the postures of the objects appearing in the captured image, for example. Therefore, when the image 251 appears in the captured image, the recognition result information 157 includes information showing the position and the posture of the image 251. The recognition result information 157 may also further contain information on the contents of the image 251.

(Object Recognition Processing)

Herein, the object recognition processing in this embodiment is further described. The object recognition processing performed by the object recognition portion 330 includes the following two kinds of processing, for example. The first processing is processing of judging which object appears (contained) in the captured image. The second processing is processing of detecting the appearance manner of the object contained in the captured image: the position and the posture (inclination, rotation, and the like) thereof in the captured image.

When the captured image is a dynamic image, the object recognition processing performed by the object recognition portion 330 includes the following two kinds of processing, for example. The first processing is a search processing. The search processing is performed when the information on an object appearing in the captured image has not been acquired yet, for example. In this case, any object has a possibility of appearing in the captured image. When the object appears in the captured image, there is a possibility that the object appears at any position in the captured image. Moreover, there is a possibility that the object appears with any posture.

On the other hand, the second processing is a tracking processing. The tracking processing is performed when the information on the object appearing in a frame prior to the frame of the captured image has already been acquired, for example. In this case, the object appearing in the former frame has a high possibility of appearing in the present frame. Therefore, these objects can be subjected to the recognition processing with priority. A possibility that the object appears also in the present frame at a position near a position where the objects have appeared in the former frame is high. Therefore, with respect to these objects, a region where the recognition processing is to be performed can be narrowed down to some extent. Therefore, the tracking processing can be performed with a lower processing load as compared with the load of the search processing.

According to the above-described definition, it is defined in this specification that when the processing of "detecting the position and the posture of an object" is performed, for example, it is a matter of course that the processing of "judging whether an object is contained" is also performed, and then when it is judged that an object is contained, the position and the posture are detected. In the following description, "search" and "tracking" may be distinguished in describing the object recognition processing. In the processing of "search", the judgment that a predetermined object appears in the captured image is also expressed as follows: the object is "found."

(1-3. Processing Flow)

Figure 4:
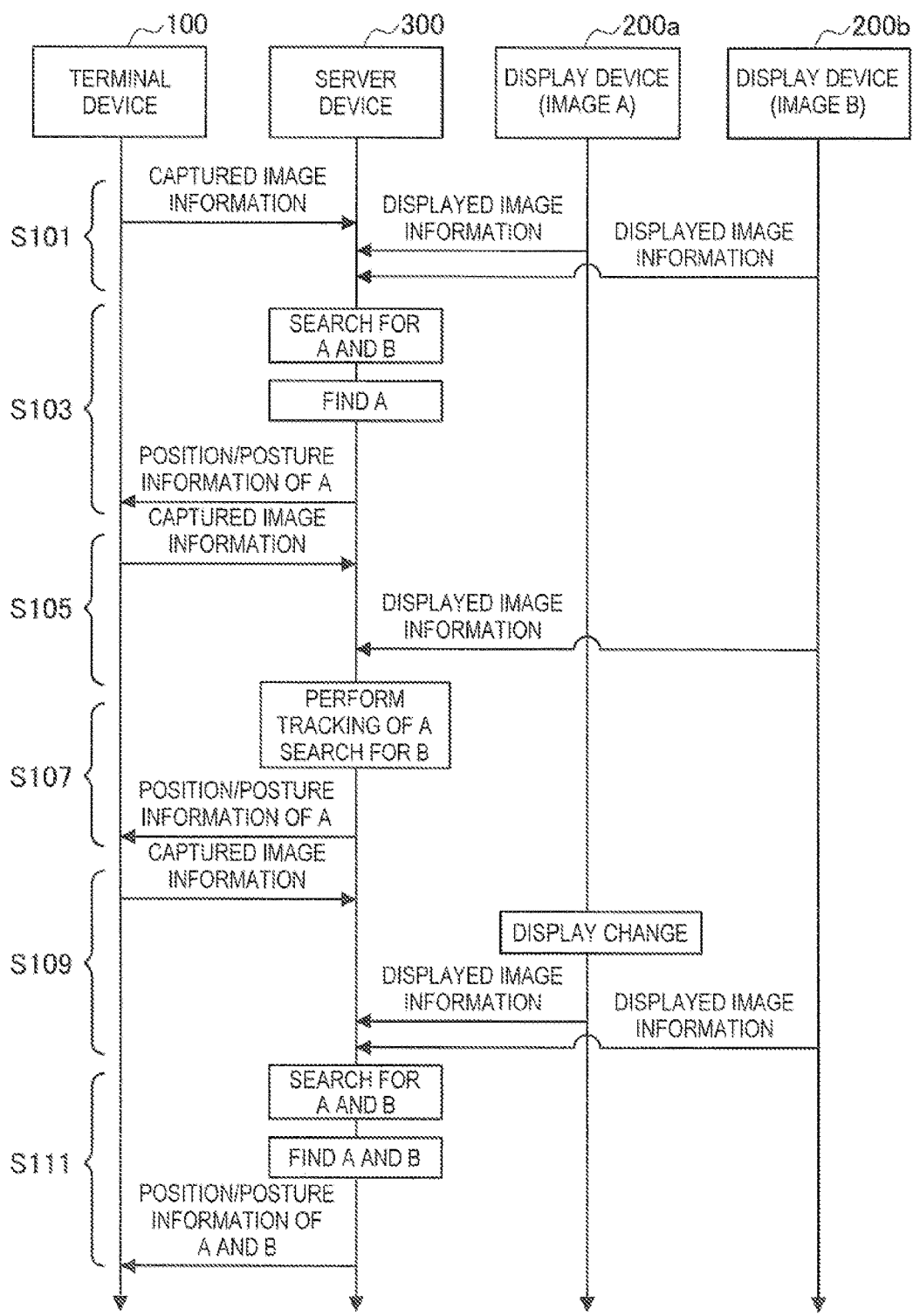
FIG. 4 is a data flow diagram showing processing in the first embodiment of the present disclosure.

Next, a processing flow of the first embodiment of the present disclosure is described with reference to FIG. 4. FIG. 4 is a data flow diagram showing processing in this embodiment. In FIG. 4, for simplicity, two devices of the plurality of display devices 200a to 200c illustrated in FIG. 2 are shown as the display devices 200a and 200b.

When FIG. 4 is referred to, first, the terminal device 100 transmits the captured image information 155 to the server device 300 in Step S101. The display devices 200a and 200b transmit the displayed image information 253a and 253b, respectively, to the server device 300.

Next, in Step S103, the object recognition portion 330 searches the images 251 (hereinafter referred to as images A and B) displayed on the display devices 200a and 200b, respectively, using the captured image information 155 and the displayed image information 253a and 253b in the server device 300. In the example illustrated in the figure, the image A is found in Step S103. Then, the server device 300 transmits the recognition result information 157 showing the position and the posture of the image A in the captured image to the terminal device 100. The terminal device 100 displays the virtual image 153 corresponding to the image A in the image 151 using the received recognition result information 157.

Next, in Step S105, the terminal device 100 transmits the captured image information 155 to the server device 300. As described above, the captured image is a dynamic image in this embodiment. The captured image information 155 to be transmitted in Step S105 corresponds to a frame after a frame corresponding to the captured image information 155 transmitted in Step S101. The captured image information 155 may not always be transmitted to all the frames of the captured image. Therefore, the captured image information 155 to be transmitted in Step S105 may correspond to a frame after several frames following the frame corresponding to the captured image information 155 transmitted in Step S101, for example.

On the other hand, similarly in Step S105, the display device 200b transmits the displayed image information 253b to the server device 300. In the process, the display device 200a may not transmit the displayed image information 253a. This is because the image A is already found in Step S103 above, and, in the following steps, tracking of the image A contained in the captured image can be performed using the detection result obtained in the process.

Next, in Step S107, the object recognition portion 330 performs tracking of the already found image A and also searches for the image B using the captured image information 155 and the displayed image information 253b in the server device 300. In the example illustrated in the figure, a display screen B is not found also in Step S107. Therefore, the server device 300 transmits the recognition result information 157 showing the position and the posture of the image A detected by the racking to the terminal device 100. The terminal device 100 may further update the virtual image 153 corresponding to the image A using the received recognition result information 157.

Next, in Step S109, the terminal device 100 transmits the captured image information 155 to the server device 300. Similarly as described in Step S105 above, the captured image information 155 to be transmitted in Step 109 corresponds to a frame further distant from the frame in Step S105.

On the other hand, similarly in Step S109, the display devices 200a and 200b transmit the displayed image information 253a and 253b, respectively, to the server device 300. Herein, the image 251 (image A) to be displayed on the display screen 250 changes between Step S105 and Step S109 in the display device 200a. Then, in Step S109, the display device 200a also transmits the displayed image information 253a to the server device 300. This is because when the image A changes, a possibility that the tracking of the image A in the object recognition portion 330 fails is high.

Next, in Step S111, the object recognition portion 330 searches for the images A and B using the captured image information 155 and the displayed image information 253a and 253b in the server device 300. The search of the image A may be performed after the tracking of the image A by the object recognition portion 330 has actually failed. In the example illustrated in the figure, both the images A and B are found in Step 111. Then, the server device 300 transmits the recognition result information 157 showing the positions and the postures of the images A and B in the captured image to the terminal device 100. The terminal device 100 displays two virtual images 153 corresponding to the image A and the image B in the image 151 using the received recognition result information 157.

(1-4. Image Information Acquisition Timing)

Figure 5:
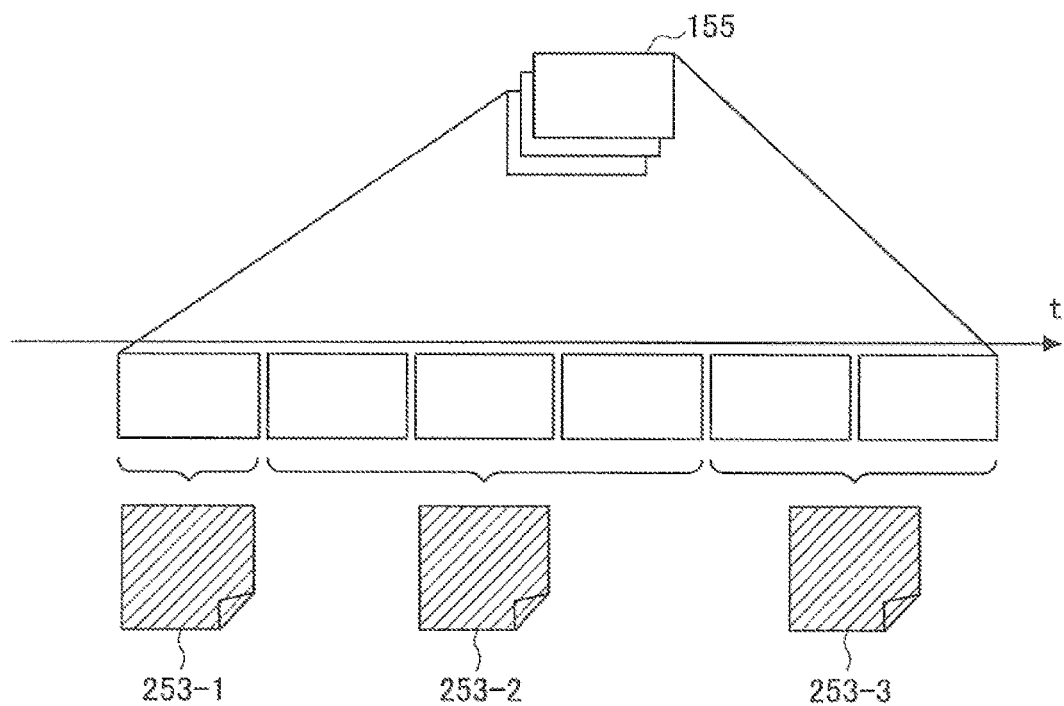
FIG. 5 is a view for explaining the timing of image information acquisition in the first embodiment of the present disclosure.

Next, the timing of the image information acquisition in this embodiment is described with reference to FIG. 5. FIG. 5 is a view for explaining the timing of the image information acquisition in this embodiment.

In FIG. 5, the captured image information 155 for six frames (which always do not constitute successive frames of a dynamic image) and the displayed image information 253-1 to 253-3 for use in recognition of the display screen 250 with the captured image information 155 are shown on the time axis in a corresponding manner.

In the example illustrated in the figure, the captured image information 155 is periodically acquired at an almost fixed interval. On the other hand, the displayed image information 253-1 to 253-3 are acquired at timing different from that of the captured image information 155. For example, the displayed image information 253-1 to 253-3 may be acquired when the image 251 changes as shown in the example of FIG. 4, for example.

Herein, the displayed image information 253 is desirably acquired at an interval longer than that of the captured image information 155. The object recognition is usually performed for each captured image information 155. Therefore, even when the displayed image information 253 is acquired at a frequency higher than that of the captured image information 155, there is a possibility that the displayed image information 253 may become consequently useless.

In the example illustrated in the figure, with respect to the captured image information 155 for six frames, the displayed image information 253-1 is used for the first one frame, the displayed image information 253-2 is used for the following three frames, and then the displayed image information 253-3 is used for the following 2 frames. Thus, in the case where while the captured image information 155 is acquired, the displayed image information 253 is not acquired, the object recognition portion 330 may continuously use the displayed image information 253 acquired before.

As described above, when the captured image information acquisition portion 310 and the displayed image information acquisition portion 320 each acquire information in chronological order, the displayed image information 253 and the captured image information 155 to be matched with each other are determined based on synchronization information contained in at least one of the captured image information 155 and the displayed image information 253, for example. The synchronization information includes information on the time at which each information is generated, for example.

In the example described above, when an exact synchronization information is acquired for a reason that time lag hardly occurs between the terminal device 100 and the display device 200, for example, the object recognition portion 330 may synchronize the displayed image information 253 and the captured image information 155 using the synchronization information as it is.

Or, the object recognition portion 330 may select the displayed image information 253 to be used with the captured image information 155 according to a delay between the captured image information 155 and the displayed image information 253. The delay may arise due to time lag between each device, a delay due to communication between each device, a processing delay in each device, or and the like, for example.

For example, the object recognition portion 330 may detect the delay by comparing the timing at which the change of the image 251 is indicated by the displayed image information 253 with the timing, at which the contents of the image 251 change, recognized from the captured image. When the delay is detected, the object recognition portion 330 can use a suitable displayed image information 253 to the captured image information 155 by applying an offset to either one of the synchronization information of the captured image information 155 or the synchronization information of the displayed image information 253, for example.

(Conclusion of Embodiment)

In the first embodiment of the present disclosure described above, information on an image which may be contained in the captured image of the terminal device is provided from the display device itself which displays the image. The recognition processing of the displayed image contained in the captured image is performed by the server device, and then the result is transmitted to the terminal device. Thus, the result of recognizing the displayed image of another device contained in the captured image can be utilized while suppressing the processing load in the terminal device to the minimum, for example.

(2. Second Embodiment)
(2-1. Device Configuration)

Figure 6A:
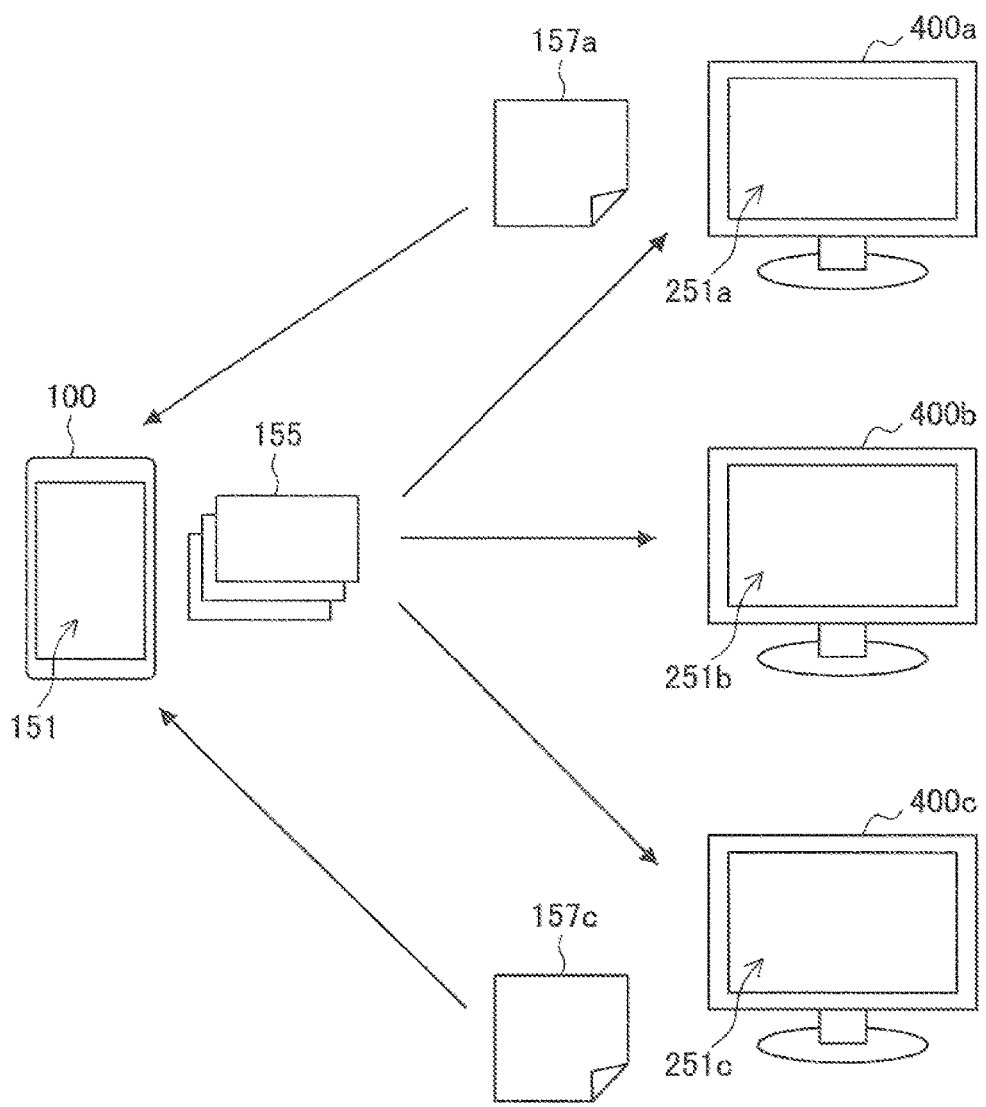
FIG. 6A is a view for explaining the device configuration of a second embodiment of the present disclosure.
Figure 7:
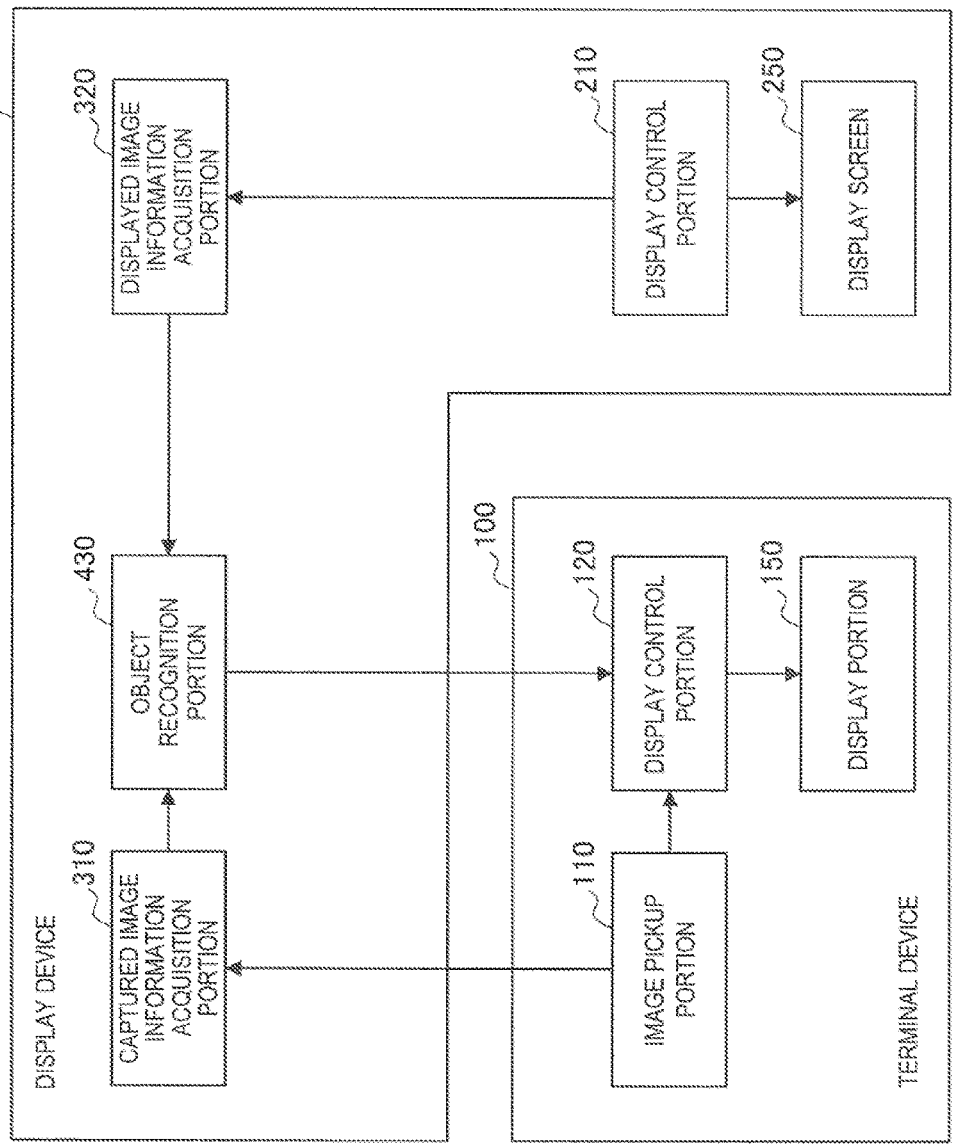
FIG. 7 is a schematic block diagram showing the functional configuration of a system according to the second embodiment of the present disclosure.

Next, the device configuration of a second embodiment of the present disclosure is described with reference to FIG. 6A, FIG. 6B, and FIG. 7. FIG. 6A and FIG. 6B are views for explaining the device configuration of this embodiment. FIG. 7 is a schematic block diagram showing the functional configuration of a system according to this embodiment. For simplicity, a plurality of display devices 400a to 400c illustrated in FIG. 6A and FIG. 6B are represented by a single display device 400 in FIG. 7.

When FIG. 6A is referred to, this embodiment relates to a terminal device 100 and display devices 400a to 400c (one example of an information processing device). The number of the display devices 400 may not be 3 as in the example illustrated in the figure and may be 1, 2, or 4 or more.

In the example illustrated in the figure, the terminal device 100 transmits captured image information 155 corresponding to a captured image to each of the display devices 400a to 400c. The contents of the captured image information 155 are the same as those in the case of the first embodiment.

On the other hand, the display devices 400a to 400c internally acquire displayed image information 253a to 253c corresponding to images 251a to 251c displayed on a display screen 250, respectively. More specifically, the display device 400a internally acquires the displayed image information 253a, the display device 400b internally acquires the displayed image information 253b, and the display device 400c internally acquires the displayed image information 253c. Herein, the contents of the displayed image information 253 are the same as those in the case of the first embodiment.

The display devices 400a to 400c perform object recognition processing using the captured image information 155 acquired from the terminal device 100 and the displayed image information 253a to 253c internally acquired by the display devices 400a to 400c, respectively. It is judged by this processing whether any one of the images 251a to 251c is contained in the captured image of the terminal device 100. When any one of the images 251a to 251c is contained in the captured image, the position and the posture thereof are also detected.

In the example illustrated in the figure, the display device 400a detects the image 251a contained in the captured image, and then transmits a recognition result information 157a including information showing the position and the posture of the image 251a to the terminal device 100. The display device 400c detects the image 251c contained in the captured image, and then transmits a recognition result information 157c including information showing the position and the posture of the image 251c to the terminal device 100. The terminal device 100 displays two virtual images 153 corresponding to the image 251a and the image 251c into the image 151 using the recognition result information 157a and 157c.

FIG. 6B illustrates a state where the display device 400a has lost (not recognized) the image 251a contained in the captured image in the state of FIG. 6A. In this process, the display device 400a searches for and detects the image 251a contained in the captured image, and then successively performs tracking of the image 251a. When the tracking fails, the display device 400a notifies the failure to the terminal device 100. Then, the display device 400a changes the processing to the image 251a to search from tracking. The terminal device 100 may terminate the display of a virtual image 153 corresponding to the image 251a in an image 151 in response to the notification.

On the other hand, the display device 400c successively succeeds in tracking of the image 251c contained in the captured image in the state of FIG. 6B. Therefore, the display device 400c successively transmits the recognition result information 157c updated according to the tracking result to the terminal device 100. The terminal device 100 may update the display of a virtual image 153 corresponding to an image 521c in the image 151 using the received recognition result information 157c.

(Functional Configuration)

When FIG. 7 is referred to, the terminal device 100 contains an image pickup portion 110, a display control portion 120, and a display portion 150. The display device 400 contains a display control portion 210, a display screen 250, a captured image information acquisition portion 310, a displayed image information acquisition portion 320, and an object recognition portion 430.

The above-described each portion is the same component as that described in the first embodiment described with reference to FIG. 3. More specifically, it can be said that the functional configuration of this embodiment is a configuration in which the function realized by the server device 300 in the first embodiment is alternatively realized by the display device 400.

However, the object recognition portion 430 contained in the display device 400 in this embodiment is different from the object recognition portion 330 of the server device 300 in the first embodiment in that the object recognition processing is performed to the image 251 which is mainly displayed by the display device 400 itself (the image 251*a* in the display device 400*a*, the image 251*b* in the display device 400*b*, and the image 251*c* in the display device 400*c*).

(2-2. Processing Flow)

Figure 8:
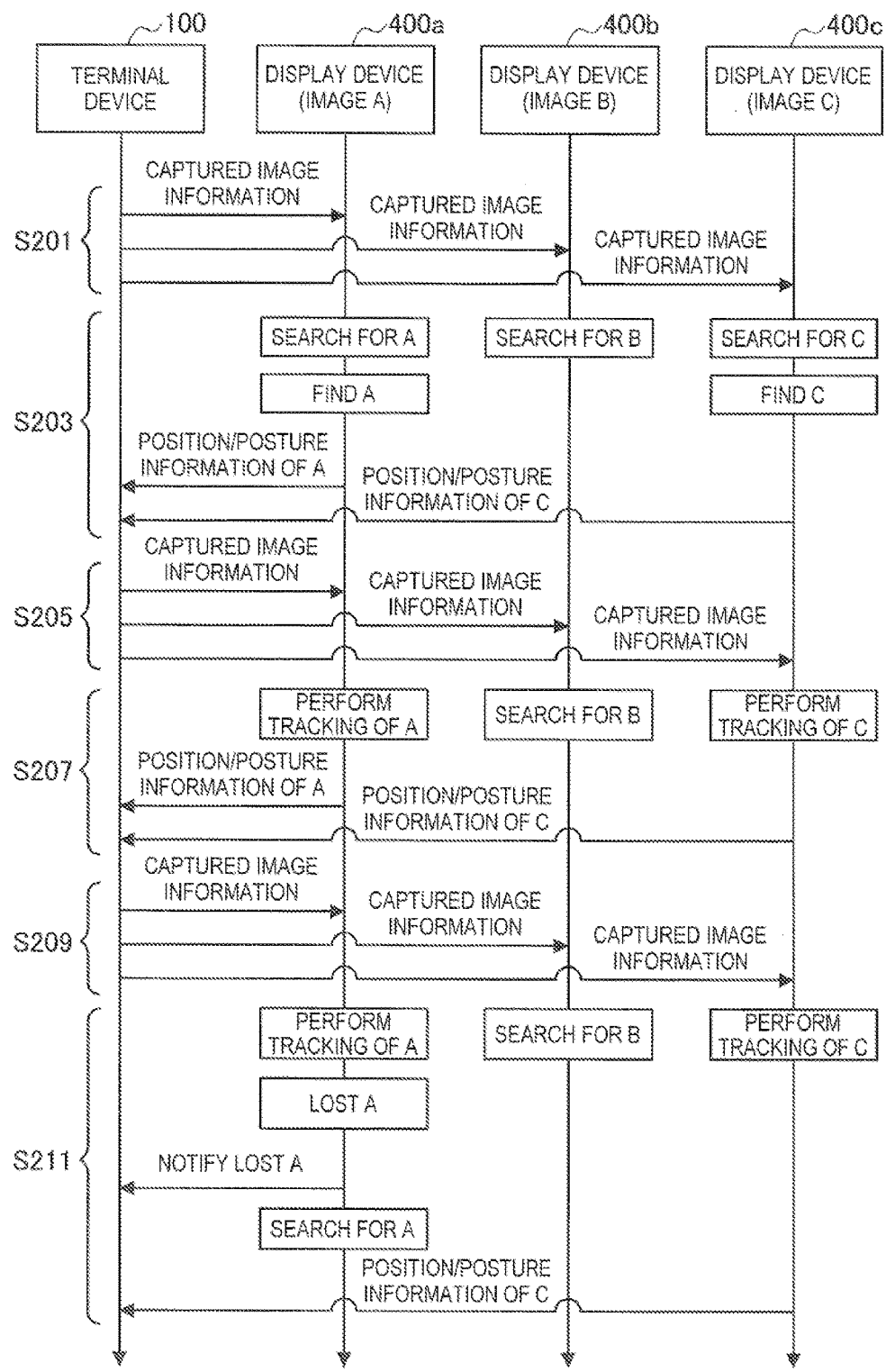
FIG. 8 is a data flow diagram showing processing in the second embodiment of the present disclosure.

Next, the processing flow of the second embodiment of the present disclosure is described with reference to FIG. 8. FIG. 8 is a data flow diagram showing the processing in this embodiment.

When FIG. 8 is referred to, the terminal device 100 first transmits the captured image information 155 to each of the display devices 400*a* to 400*c* in Step S201.

Next, in Step S203, the object recognition portion 430 searches for the image 251*a* (hereinafter referred to as an image A) using the captured image information 155 and the internally acquired displayed image information 253*a* in the display device 400*a*. In the example illustrated in the figure, the image A is found in Step S203. The display device 400*a* transmits the recognition result information 157*a* showing the position and the posture of the image A in the captured image to the terminal device 100. The terminal device 100 displays the virtual image 153 corresponding to the image A in the image 151 using the received recognition result information 157*a*.

Similarly in Step S203, the object recognition portion 430 searches for the image 251*b* (hereinafter referred to as an image B) using the captured image information 155 and the internally acquired displayed image information 253*b* in the display device 400*b*. The image B is not found in the example illustrated in the figure.

On the other hand, the object recognition portion 430 searches for the image 251*c* (hereinafter referred to as an image C) using the captured image information 155 and the internally acquired displayed image information 253*c* in the display device 400*c*. The image C is found in Step S203 in the example illustrated in the figure. Then, the display device 400*c* transmits the recognition result information 157*c* showing the position and the posture of the image C to the terminal device 100. The terminal device 100 displays the virtual image 153 corresponding to the image C in the image 151 using the received recognition result information 157*c*.

Next, in Step S205, the terminal device 100 transmits the captured image information 155 to each of the display devices 400*a* to 400*c*. Since the captured image is a dynamic image in this embodiment, the captured image information 155 to be transmitted in Step S205 corresponds to a frame after the frame corresponding to the captured image information 155 transmitted in Step S201.

Next, in Step S207, the object recognition portion 430 performs tracking of the already found image A in the display device 400*a*. In the example illustrated in the figure, the tracking of the image A is successfully performed. Then, the display device 400*a* transmits the recognition result information 157*a* showing the position and the posture of the image A updated according to the tracking result to the terminal device 100. The terminal device 100 updates the display of the virtual image 153 contained in the image 151 using the received recognition result information 157*a*.

Similarly in Step S207, the display device 400*b* searches for the image B in the same manner as in Step S203 but the image B is not found. On the other hand, the display device 400*c* performs tracking of the image C in the same manner as in the display device 400*a*, and then transmits the recognition result information 157*c* to the terminal device 100. The terminal device 100 updates the display of the virtual image 153 contained in the image 151 using the received recognition result information 157*c*.

Next, in Step S209, the terminal device 100 transmits the captured image information 155 to each of the display devices 400*a* to 400*c*. Similarly as described in Step S205 above, the captured image information 155 to be transmitted in Step S209 corresponds to a frame further distant from the frame in Step S205.

Next, in Step S211, the object recognition portion 430 successively performs the tracking of the image A in the display device 400*a*. In the example illustrated in the figure, the tracking of the image A fails in Step S211, i.e., the display device 400*a* has lost the image A. Then, the display device 400*a* transmits a notification that the image A has been lost to the terminal device 100. The terminal device 100 receiving the notification terminates the display of the virtual image 153 corresponding to the image A in the image 151. On the other hand, the display device 400*a* searches for the image A again using the captured image information 155 received in Step S209 and the internally acquired displayed image information 253*a*.

Similarly in Step S211, the display device 400*b* searches for the image B in the same manner as in Step S203 above but the image B is not found. On the other hand, the display device 400*c* performs tracking of the image C in the same manner as in Step S207 above, and then transmits the recognition result information 157*c* to the terminal device 100. The terminal device 100 updates the display of the virtual image 153 contained in the image 151 using the received recognition result information 157*c*.

(Conclusion of Embodiment)

In the second embodiment of the present disclosure described above, the search processing and the tracking processing of the image contained in the captured image are performed by the display device itself which displays the image, and then the result is transmitted to the terminal device. Thus, for example, a calculation resource of the display can be effectively utilized, whereby the processing load in the terminal device can be suppressed. Moreover, a communication resource can be saved due to the fact that the displayed image information may not be transmitted between devices, for example.

(3. Third Embodiment)

(3-1. Device Configuration)

Figure 9A:
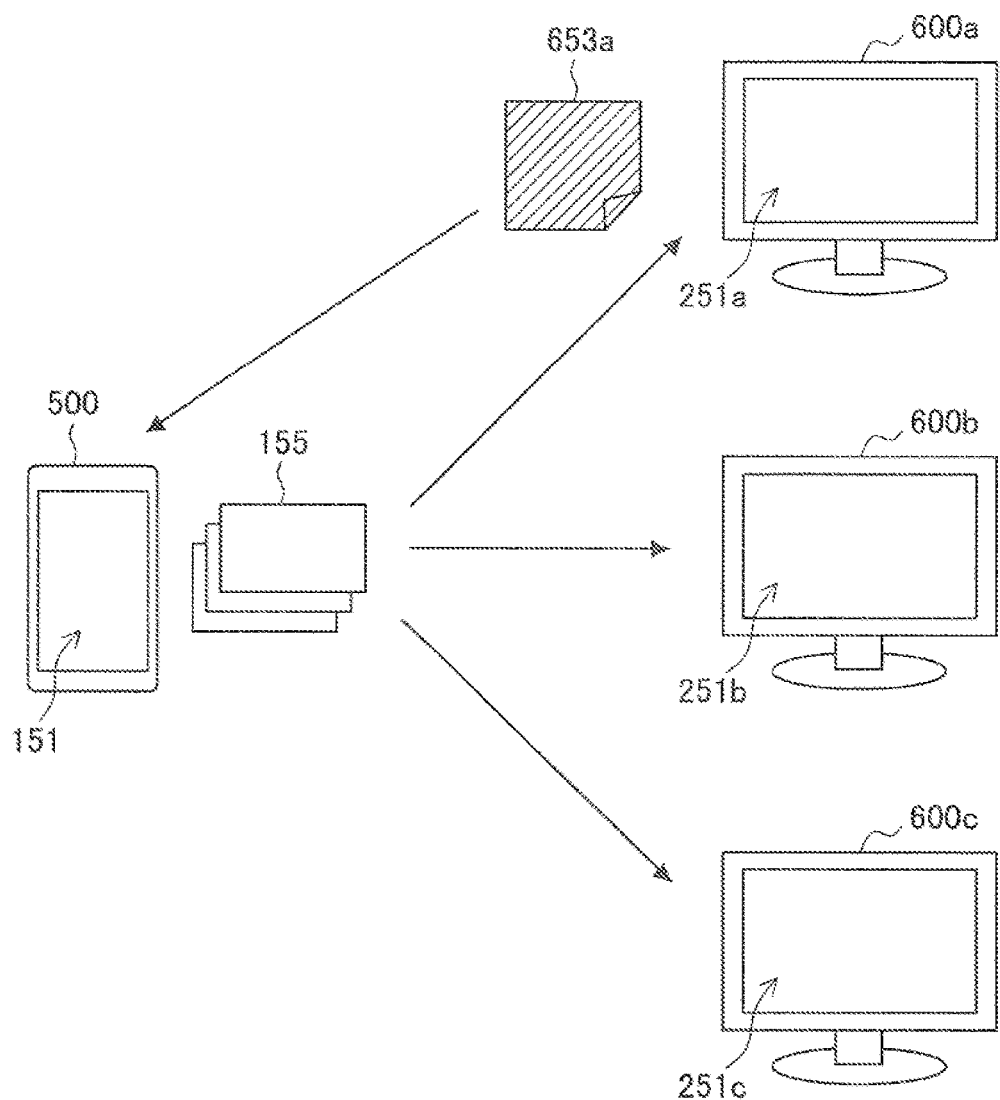
FIG. 9A is a view for explaining the device configuration of a third embodiment of the present disclosure.
Figure 9B:
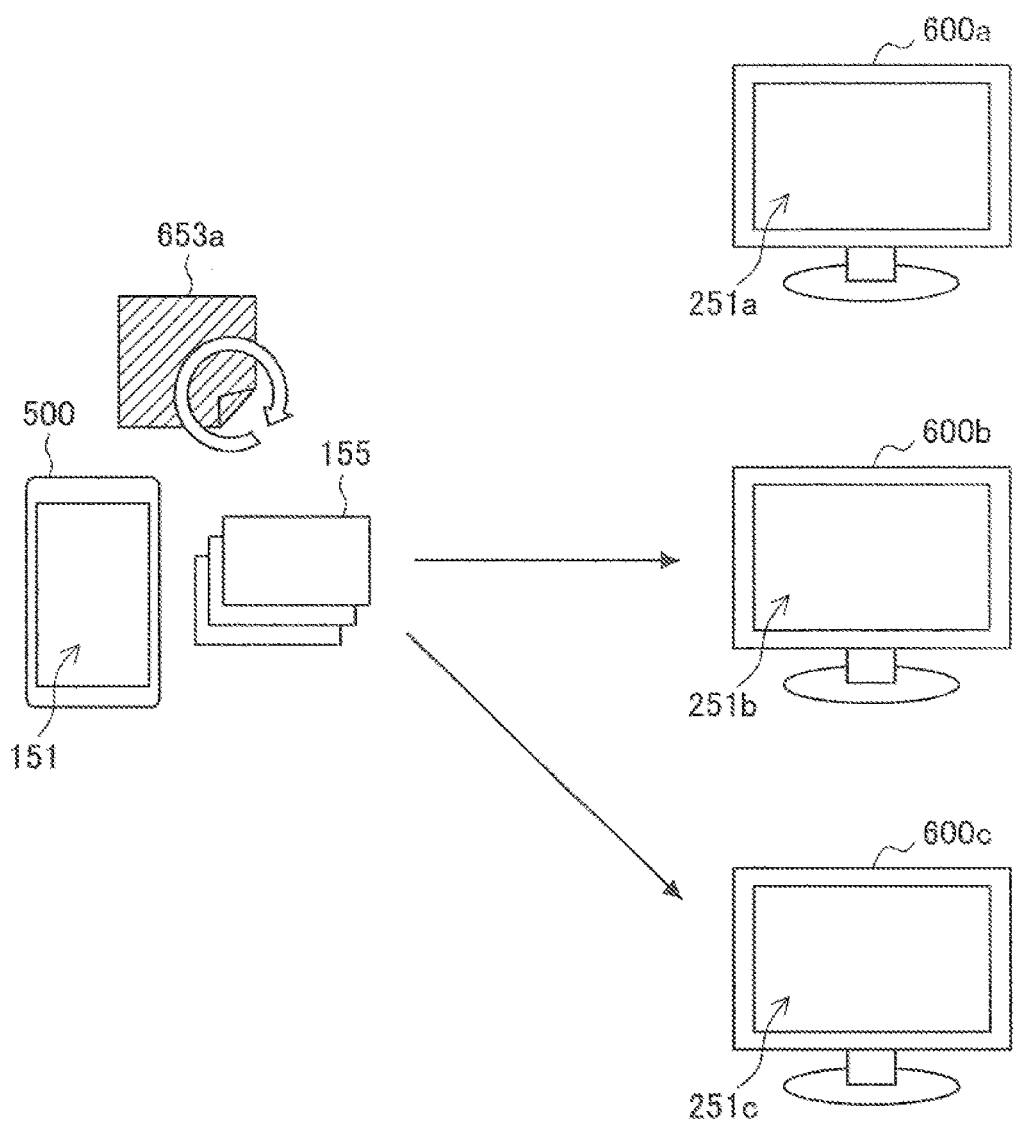
FIG. 9B is a view for explaining the device configuration of the third embodiment of the present disclosure.
Figure 10:
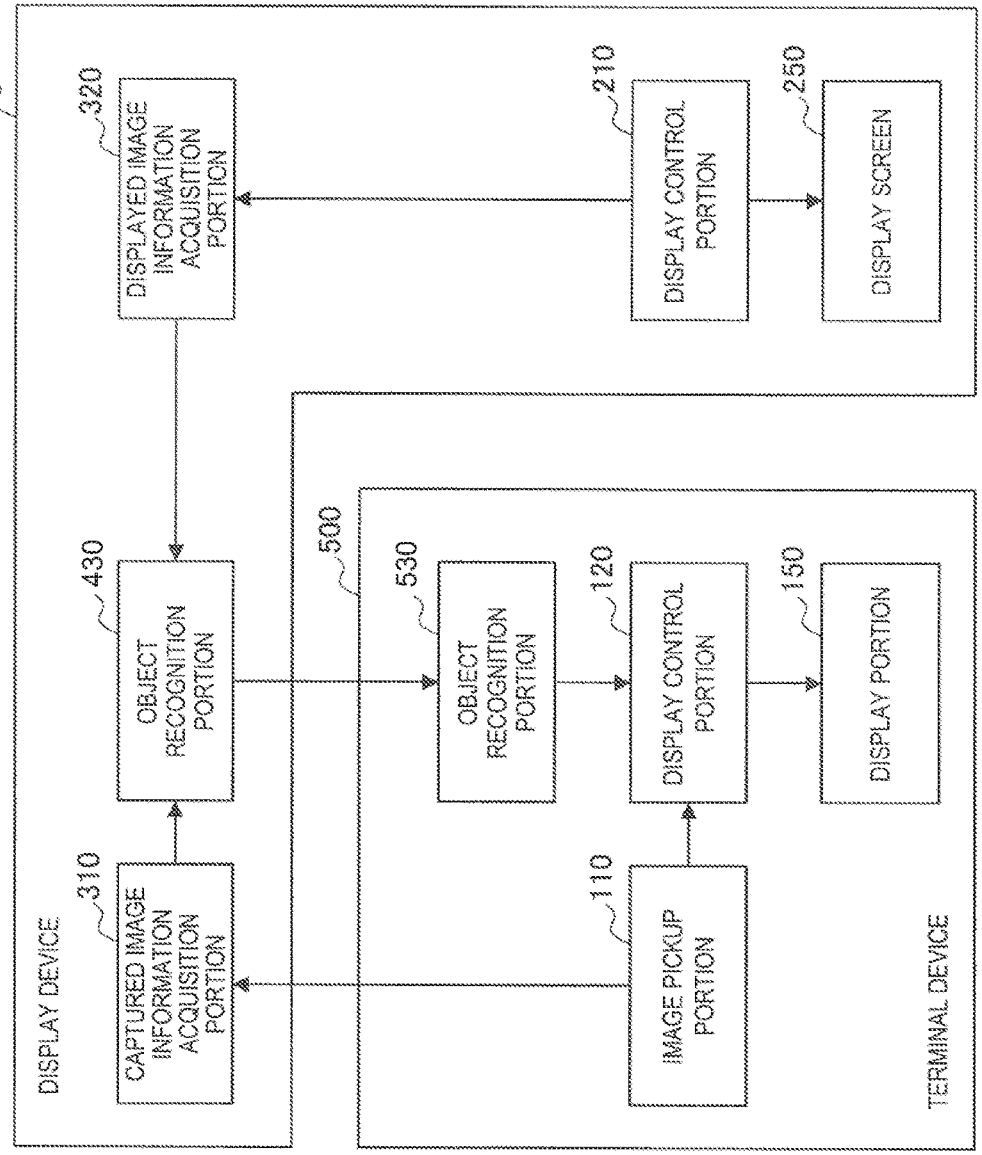
FIG. 10 is a schematic block diagram showing the functional configuration of a system according to the third embodiment of the present disclosure.

Next, the device configuration of a third embodiment of the present disclosure is described with reference to FIG. 9A to FIG. 9C and FIG. 10. FIG. 9A to FIG. 9C are views for explaining the device configuration of this embodiment. FIG. 10 is a schematic block diagram showing the functional configuration of a system according to this embodiment. In FIG. 10, for simplicity, a plurality of display devices 600*a* to 600*c* illustrated in FIG. 9A to FIG. 9C are represented by a single display 600.

When FIG. 9A is referred to, this embodiment relates to a terminal device 500 and the display devices 600*a* to 600*c* (one example of an information processing device). The number of the display devices 600 may not be 3 as in the example illustrated in the figure and may be 1, 2, or 4 or more.

In the example illustrated in the figure, the terminal device 500 transmits captured image information 155 corresponding to a captured image to each of the display devices 600*a* to 600c. The contents of the captured image information 155 are the same as those in the case of the first embodiment.

On the other hand, the display devices 600a to 600c internally acquire displayed image information 253a to 253c corresponding to images 251a to 251c, respectively, displayed on a display screen 250. More specifically, the display device 600a internally acquires the displayed image information 253a, the display device 600b internally acquires the displayed image information 253b, and the display device 600c internally acquires the displayed image information 253c. Herein, the contents of the displayed image information 253 are the same as those in the case of the first embodiment.

Furthermore, the display devices 600a to 600c perform object recognition processing using the captured image information 155 acquired from the terminal device 500 and the displayed image information 253a to 253c internally acquired by the display devices 600a to 600c, respectively. It is judged by this processing whether any one of the images 251a to 251c is contained in the captured image of the terminal device 100. When any one of the images 251a to 251c is contained in the captured image, the position and the posture are also detected.

In the example illustrated in the figure, the display device 600a finds the image 251a contained in the captured image. Then, the display device 600a transmits a tracking information 653a which can be utilized for tracking of the image 251a to the terminal device 500. The tracking information 653a may include information on the position and the posture of the image 251a in the captured image and the contents of the image 251a, for example. The terminal device 100 performs the tracking of the image 251a using the tracking information 653a, and then displays a virtual image 153 corresponding to the image 251a in the image 151.

FIG. 9B shows a state after the image 251a is detected in FIG. 9A. After the position and the posture of the image 251a contained in the captured image are detected (searched), the display device 600a delegates detection (tracking) of the position and the posture of the image 251a to the terminal device. More specifically, the terminal device 500 does not transmit the captured image information 155 to the display device 600a. The display device 600a also does not transmit the tracking information 653a to the terminal device. The terminal device 500 performs the tracking of the image 251a contained in the captured image successively using the tracking information 653a received before, and then updates the display of the virtual image 153 in the image 151 using the tracking result.

On the other hand, the terminal device 500 successively transmits the captured image information 155 to the display devices 600b and 600c. The display devices 600b and 600c search for the images 251b and 251c, respectively, similarly as in the state of FIG. 9A.

FIG. 9C illustrates a state where the image 251a displayed on the display device 400a has changed or the tracking of the image 251a by the terminal device 500 has failed in the state of FIG. 9B. In this process, the display device 400a detects (searches) the position and the posture of the image 251a again, and then transmits a new tracking information 653a to the terminal device 500. The terminal device 500 performs tracking of the image 251a using the newly received tracking information 653a, and then updates the display of the virtual image 153 in the image 151.

(Functional Configuration)

When FIG. 10 is referred to, the terminal device 500 contains an image pickup portion 110, a display control portion 120, a display portion 150, and an object recognition portion 530. The display device 600 contains a display control portion 210, a display screen 250, a captured image information acquisition portion 310, a displayed image information acquisition portion 320, and an object recognition portion 430.

The above-described each portion is the same component as that described in the second embodiment with reference to FIG. 7. In this embodiment, the object recognition portion is contained in both the terminal device 500 and the display device 600.

The object recognition portion 430 of the display device 600 performs mainly a search processing of the image 251 displayed by the display device 600 itself. As described above with reference to FIG. 9A to FIG. 9C, the object recognition portion 430 of the display device 600 performs the processing of searching for the image 251 until the image 251 is found in the captured image. When the image 251 is found, the object recognition portion 430 transmits s tracking information 653 containing information on the position and the posture of the image 251 and the contents of the image 251, for example, to the object recognition portion 530 of the terminal device 500. Thereafter, the object recognition portion 430 may stop the recognition processing of the image 251 until the tracking of the image 251 by the terminal device 500 fails or the contents of the image 251 are changed.

On the other hand, the object recognition portion 530 of the terminal device 500 performs processing of performing tracking of the image 251 when the image 251 is found in the captured image. The information on the position and the posture of the image 251 found before and the contents of the image 251 to be used for the tracking processing may be acquired from the tracking information 653 transmitted by the object recognition portion 430 of the display device 600. Therefore, even when the search processing with relatively high processing load is not performed, the object recognition portion 530 can start tracking processing with relatively low processing load.

The recognition processing of an object other than image 251 may be performed by either one of the object recognition portion 430 or the object recognition portion 530 described above. Similarly, an object recognition portion which performs the recognition processing of an object other than the image 251 may be contained in the terminal device 100 also in the first and second embodiments.

(3-2. Processing Flow)

Figure 11:
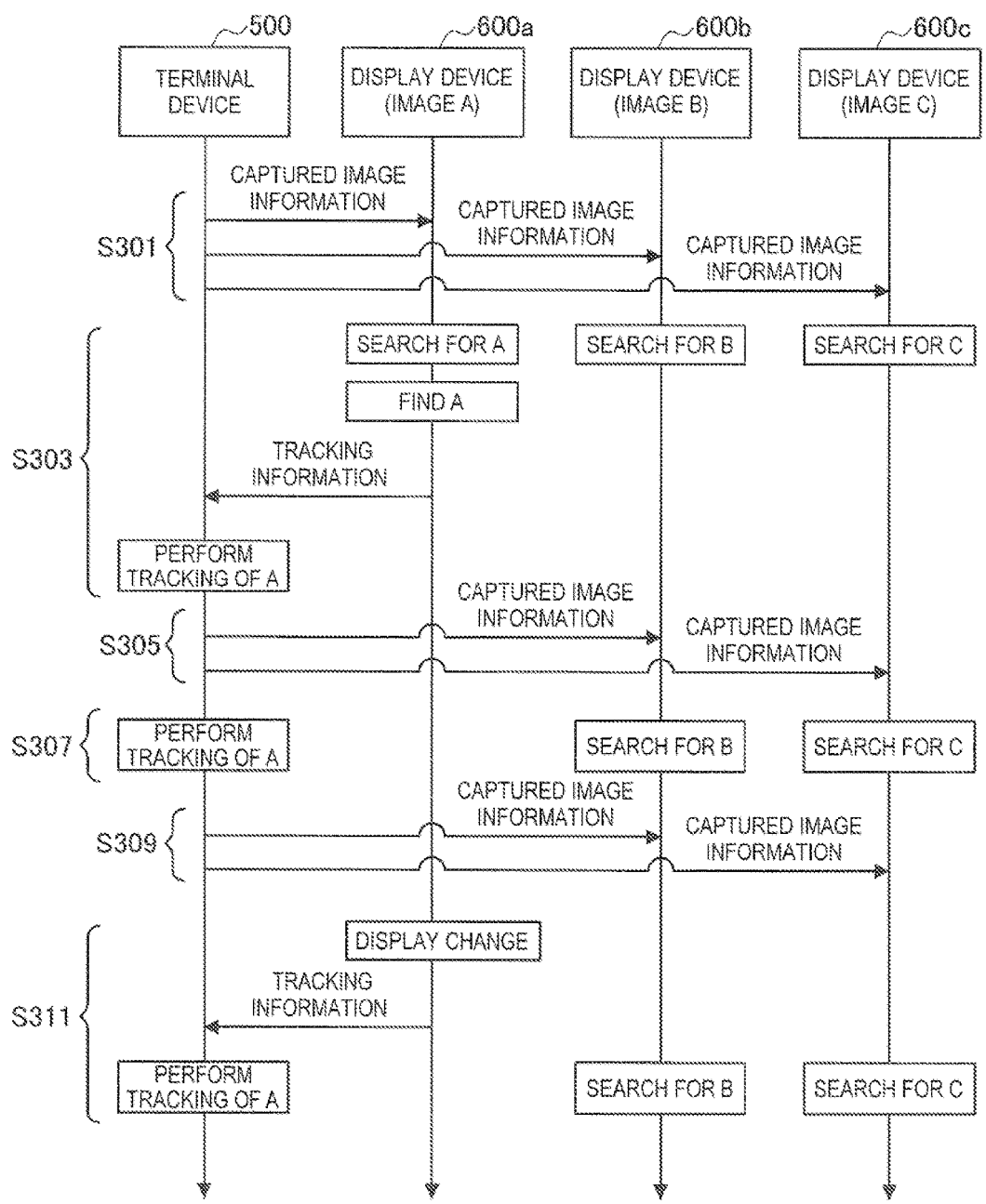
FIG. 11 is a data flow diagram showing processing in the third embodiment of the present disclosure.

Next, the processing flow of a third embodiment of the present disclosure is described with reference to FIG. 11. FIG. 11 is a data flow diagram showing the processing in this embodiment.

When FIG. 11 is referred to, the terminal device 500 first transmits the captured image information 155 to each of the display devices 600a to 600c in Step S301.

Next, in Step S303, the object recognition portion 430 searches for the image 251a (hereinafter referred to as an image A) using the captured image information 155 and the internally acquired displayed image information 253a in the display device 600a. In the example illustrated in the figure, the image A is found in Step S303. The display device 600a transmits the tracking information 653a which can be utilized for the tracking of the image 251a to the terminal device 500. The object recognition portion 530 of the terminal device 100 performs tracking of the image A using the received tracking information 653a, and then displays a virtual image 153 corresponding to the image A in the image 151. On the other hand, in the display devices 600b and 600c, the object recognition portion 430 searches for the image 251b (hereinafter referred to as an image B) and the image 251c (hereinafter referred to as an image C), but the images are not found.

Next, in Step S305, the terminal device 500 transmits the captured image information 155 to each of the display devices 600b and 600c. In this embodiment, since the captured image is a dynamic image, the captured image information 155 to be transmitted in Step S305 corresponds to a frame after the frame corresponding to the captured image information 155 transmitted in Step S301. As described above, since the terminal device 500 recognizes the image A at this point, the terminal device 500 does not transmit the captured image information 155 to the display device 600a.

Next, in Step S307, the object recognition portion 530 performs tracking of the image A in the terminal device 500. On the other hand, in the display devices 600b and 600c, the object recognition portion 430 searches for the image B and the image C but the images are not found.

Next, in Step S309, the terminal device 500 transmits the captured image information 155 to each of the display devices 600b and 600c in the same manner as in Step S305.

Next, in Step S311, the display device 600a detects a change of the image 251a. Then, the display device 600a transmits a tracking information 653a corresponding to the image 251a after the change to the terminal device 500. In the terminal device 500, the object recognition portion 530 performs tracking of the image 251a using the newly received tracking information 653a, and then updates the display of the virtual image 153 in the image 151 using the tracking result.

(Conclusion of Embodiment)

In the third embodiment of the present disclosure described above, while the search of the image contained in the captured image is performed by the display device itself which displays the image, the tracking after the displayed image is found by the search is performed by the terminal device which acquires the captured image. More specifically, the tracking processing with a relatively low processing load is performed by the terminal device while dispersing the processing load of the search with the highest processing load from the terminal device. Thus, an unnecessary consumption of a calculation resource of the display device is prevented, for example. Moreover, a communication resource can be saved by eliminating the necessity of transmitting the captured image information to all the display devices, for example.

(4. Supplement)

Although the description above describes the embodiments of the present disclosure mainly relating to the information processing devices, methods performed by the information processing devices, programs which cause these information processing devices to realize functions, and recording media recording such a program may be realized as the embodiments of the present disclosure.

Moreover, although the description above describes the example in which the server device or the display device functions as the information processing device, the terminal device may function as the information processing device, for example. Also in this case, the processing load of the object recognition in the terminal device is reduced due to the fact that the information corresponding to the image displayed by the display device is provided.

(Hardware Configuration)

Finally, the hardware configuration of an information processing device 900 which may realize the terminal devices 100, 500, the display devices 200, 400, 600, and the server device 300 according to the embodiments of the present disclosure is described with reference to FIG. 12. FIG. 12 is a block diagram for explaining the hardware configuration of the information processing device.

The information processing device 900 contains a central processing unit (CPU) 901, a read only memory (ROM) 903, and a random access memory (RAM) 905. Furthermore, the information processing device 900 may also contain a host bus 907, a bridge 909, an external bus 911, an interface 913, an input device 915, an output device 917, a storage device 919, a drive 921, a connection port 923, and a communication device 925. The information processing device 900 may have a processing circuit, such as digital signal processor (DSP), in place of or together with the CPU 901.

The CPU 901 functions as an arithmetic processing device and a control device and controls all or some operations in the information processing device 900 according to various programs recorded in the ROM 903, the RAM 905, the storage device 919, or a removable recording medium 927. The ROM 903 stores a program, an operation parameter, and the like to be used by the CPU 901. The RAM 905 primarily stores a program to be used in the execution of the CPU 901, parameters which change as appropriate in the execution thereof, and the like. The CPU 901, the ROM 903, and the RAM 905 are connected to each other by the host bus 907 constituted by an internal bus, such as a CPU bus. Furthermore, the host bus 907 is connected to the external bus 911, such as a peripheral component interconnect/interface (PCI) bus, through the bridge 909.

An input device 915 is a device operated by a user, such as a mouse, a keyboard, a touch panel, a button, a switch, a lever, and the like, for example. The input device 915 may be a remote control device utilizing infrared rays or other electric waves, for example, or may be an external connection device 929, such as a cellular phone corresponding to an operation of the information processing device 900. The input device 915 contains an input control circuit which generates an input signal based on information input by a user, and then outputs the input signal to the CPU 901. The user operates the input device 915 to thereby input various kinds of data or direct a processing operation to the information processing device 900.

The output device 917 is constituted by a device capable of visually or audibly notifying the acquired information to a user. The output device 917 may be, for example, a display device, such as a liquid crystal display (LCD), a plasma display panel (PDP), and an organic electro-luminescence (EL) display, a sound output device, such as a speaker and a headphone, a printer device, and the like. The output device 917 outputs the result obtained by the processing of the information processing device 900 as a picture, such as a text or an image, or outputs the same as a sound, such as a voice or a sound.

The storage device 919 is a data storing device constituted as one example of a storage portion of the information processing device 900. The storage device 919 is constituted by a magnetic storage device, such as a hard disk drive (HDD), a semiconductor storage device, an optical storage device, or a magneto-optical storage device, or the like, for example. The storage device 919 stores a program and various kinds of data to be performed by the CPU 901, various kinds of data acquired from the outside, and the like.

The drive 921 is a reader/writer for the removable recording media 927, such as a magnetic disk, an optical disk, a magneto-optical disk, or a semiconductor memory, and is built in or externally attached to the information processing device 900. The drive 921 reads information recorded on the attached removable recording medium 927, and then outputs the read information to the RAM 905. The drive 921 writes a record in the attached removable recording medium 927.

The connection port 923 is a port for directly connecting a device to the information processing device 900. The connection port 923 may be a universal serial bus (USB) port, an IEEE1394 port, an small computer system interface (SCSI) port, or the like, for example. The connection port 923 may also be an RS-232C port, an optical audio terminal, a high-definition multimedia interface (HDMI) port, or the like. By connecting the external connection device 929 to the connection port 923, various kinds of data may be exchanged between the information processing device 900 and the external connection device 929.

The communication device 925 is a communication interface constituted by a communication device for the connection with the communication network 931 and the like, for example. The communication device 925 may be a communication card for a wired or wireless local area network (LAN), Bluetooth (Registered Trademark), a wireless USB (WUSB), or the like. The communication device 925 may also be a router for optical communication, a router for an asymmetric digital subscriber line (ADSL), or a modem for various communications. The communication device 925 transmits and receives a signal and the like between the Internet or other communication devices using predetermined protocols, such as TCP/IP, for example. The communication network 931 connected to the communication device 925 is a wired or wirelessly-connected network and may be the Internet, a home LAN, infrared data communication, radio wave data communication, or satellite data communication, for example.

The image pickup device 933 is a device which captures an image of a real space using various kinds of members, such as an image pickup element, such as a charge coupled device (CCD) or a complementary metal oxide semiconductor (CMOS), and a lens for controlling image formation of a target image to the image pickup element to generate a captured image, for example. The image pickup device 933 may be one which captures a still image or may be one which captures a dynamic image.

The sensor 935 includes various kinds of sensors, such as an accelerometer, a gyroscope sensor, a geomagnetism sensor, an optical sensor, and a sound sensor, for example. The sensor 935 acquires information on the state of the information processing device 900, such as the posture of a case of the information processing device 900 itself, and information on the circumferential environment of the information processing device 900, such as brightness, noise, and the like around the information processing device 900, for example. The sensor 935 may also contain a global positioning system (GPS) sensor which receives a GPS signal to measure the latitude, the longitude, and the altitude of a device.

The above description describes one example of the hardware configuration of the information processing device 900. Each of the above-described components may be configured employing general-purpose members or may be configured by a hardware tailored to the function of each component. Such configurations may be changed as appropriate according to the technological level when the embodiments are implemented.

As described above, a suitable embodiment of the present disclosure is described in detail with reference to the attached drawings but the present disclosure is not limited to this example. It is clear that various modifications and alterations are easily conceived by a person having ordinary skill in the art to which the present disclosure pertains within the scope of the technical idea described in claims and it should be understood that the examples are to be included in the technical scope of the present disclosure.

Additionally, the present technology may also be configured as below.

(1) An information processing device including:
   a captured image information acquisition portion which acquires captured image information corresponding to a captured image;
   a displayed image information acquisition portion which acquires displayed image information corresponding to a first image displayed on a display screen; and
   an object recognition portion which detects the position and the posture of the first image in the captured image using the displayed image information and the captured image information.

(2) The information processing device according to (1), wherein the displayed image information acquisition portion acquires the displayed image information at a timing different from that of the captured image information.

(3) The information processing device according to (2), wherein the displayed image information acquisition portion acquires the displayed image information when the first image changes.

(4) The information processing device according to (2) or (3), wherein the displayed image information acquisition portion acquires the displayed image information at an interval longer than that of the captured image information.

(5) The information processing device according to (4), wherein the object recognition portion detects the position and the posture of the first image using the displayed image information acquired before when the captured image information is acquired and the displayed image information is not acquired.

(6) The information processing device according to any one of (2) to (5), wherein the displayed image information acquisition portion acquires the displayed image information when the position and the posture of the first image are not detected.

(7) The information processing device according to any one of (1) to (6),
   wherein the captured image information acquisition portion and the displayed image information acquisition portion acquire the captured image information and the displayed image information, respectively, in chronological order, and
   wherein synchronization information which synchronizes the captured image information and the displayed image information is contained in at least either one of the captured image information or the displayed image information acquisition portion.

(8) The information processing device according to any one of (1) to (7),
   wherein the captured image information acquisition portion and the displayed image information acquisition portion acquire the captured image information and the displayed image information, respectively, in chronological order, and
   wherein the object recognition portion selects the displayed image information to be used with the captured image information according to a delay between the captured image information and the displayed image information.

(9) The information processing device according to any one of (1) to (8), wherein the object recognition portion transmits information showing the position and the posture of the first image to an image pickup device which captures the captured image.

(10) The information processing device according to (9), wherein the object recognition portion delegates subsequent detection of the position and the posture of the first image to the image pickup device when the position and the posture of the first image has been detected.

(11) The information processing device according to (10), wherein the object recognition portion detects the position and the posture of the first image again when the position and the posture of the first image has not been detected by the image pickup device.

(12) The information processing device according to (10) or (11), wherein the object recognition portion detects a position and a posture of the first image again when the first image has changed.

(13) The information processing device according to any one of (1) to (12), which is a display device further including the display screen.

(14) An information processing method including:
acquiring captured image information corresponding to a captured image;
acquiring displayed image information corresponding to a first image displayed on a display screen; and
detecting the position and the posture of the first image in the captured image using the displayed image information and the captured image information.

(15) A program for causing a computer to realize:
a function of acquiring captured image information corresponding to a captured image;
a function of acquiring displayed image information corresponding to a first image displayed on a display screen; and
a function of detecting the position and the posture of the first image in the captured image using the displayed image information and the captured image information.

REFERENCE SIGNS LIST 100,500 terminal device
110 image pickup portion
120 display control portion
150 display portion
155 captured image information
157 recognition result information
200,400,600 display device
210 display control portion
250 display screen
251 image (first image)
253 displayed image information
300 server device
310 captured image information acquisition portion
320 displayed image information acquisition portion
330,430,530 object recognition portion
653 tracking information

The invention claimed is:

1. An information processing device, comprising:
a central processing unit (CPU) configured to:
receive, from an image pickup device, first image information of a first image,
wherein the first image is captured by the image pickup device;
receive, from a display device that has been captured by the image pickup device to generate the first image, second image information of a second image that is displayed on the display device;
detect, based on the first image information and the second image information, whether the second image is contained in the first image;
detect a position of the second image in the first image and a posture of the second image in the first image, based on the detection that the second image is contained in the first image; and
transmit, to the image pickup device, third information that comprises the detected position of the second image in the first image and the detected posture of the second image in the first image,
wherein the image pickup device displays a virtual image corresponding to the second image based on the third information.

2. The information processing device according to claim 1,
wherein the CPU is further configured to receive the second image information at a second time that is different from a first time of the reception of the first image information.

3. The information processing device according to claim 2,
wherein the CPU is further configured to receive the second image information based on a change of the second image that is displayed on a display screen of the display device.

4. The information processing device according to claim 2,
wherein the CPU is further configured to receive the second image information at a second time interval that is longer than a first time interval of the reception of the first image information.

5. The information processing device according to claim 4,
wherein the CPU is further configured to:
detect the position of the second image and the posture of the second image, based on the second image information, and
receive the second image information, based on an availability of the first image information and an unavailability of the second image information.

6. The information processing device according to claim 2,
wherein the CPU is further configured to receive the second image information, based on the position of the second image and the posture of the second image that are undetected.

7. The information processing device according to claim 1,
wherein the CPU is further configured to:
receive the first image information and the second image information in a chronological order, and
synchronize the first image information and the second image information, based on synchronization information,
wherein the synchronization information is contained in at least one of the first image information or the second image information.

8. The information processing device according to claim 1,
wherein the CPU is further configured to:
receive the first image information and the second image information in a chronological order, and select the second image information for use with the first image information, based on a delay in the reception the first image information and the second image information.

9. The information processing device according to claim 1, wherein, based on the detection of the position of the second image and the posture of the second image, the CPU is further configured to delegate a subsequent detection of the position of the second image and the posture of the second image to the image pickup device.

10. The information processing device according to claim 9, wherein, based on a failure in the detection of the position of the second image and the posture of the second image, the CPU is further configured to detect the position of the second image and the posture of the second image.

11. The information processing device according to claim 9, wherein the CPU is further configured to detect the position of the second image and the posture of the second image, based on a change of the second image that is displayed on a display screen of the display device.

12. The information processing device according to claim 1, wherein the information processing device is one of the image pickup device or the display device.

13. The information processing device according to claim 1, wherein the CPU is further configured to display the virtual image on a display screen of the display device, that comprises the image pickup device, based on the transmitted third information, and wherein the virtual image corresponds to the second image.

14. The information processing device according to claim 13, wherein the CPU is further configured to display the virtual image instead of a part of the first image.

15. The information processing device according to claim 13, wherein the CPU is further configured to change the display of the virtual image on the display screen based on an operation state of the display device that comprises the display screen.

16. The information processing device according to claim 13, wherein the CPU is further configured to change the display of the virtual image on the display screen based on a reproduction state of contents displayed on the display screen.

17. An information processing method, comprising:
in an information processing device:
receiving, from an image pickup device, first image information of a first image,
wherein the first image is captured by the image pickup device;
receiving, from a display device that has been captured by the image pickup device to generate the first image, second image information of a second image that is displayed on the display device;
detecting, based on the first image information and the second image information, whether the second image is contained in the first image;
detecting a position of the second image in the first image and a posture of the second image in the first image, based on the detection that the second image is contained in the first image; and
transmitting, to the image pickup device, third information showing the detected position of the second image in the first image and the detected posture of the second image in the first image,
wherein the image pickup device displays a virtual image corresponding to the second image based on the third information.

18. A non-transitory computer-readable medium having stored thereon, computer-executable instructions for causing an information processing device to execute operations, the operations comprising:
receiving, from an image pickup device, first image information of a first image,
wherein the first image is captured by the image pickup device;
receiving, from a display device that has been captured by the image pickup device to generate the first image, second image information of a second image that is displayed on the display device;
detecting, based on the first image information and the second image information, whether the second image is contained in the first image;
detecting a position of the second image in the first image and a posture of the second image in the first image, based on the detection that the second image is contained in the first image; and
transmitting, to the image pickup device, third information showing the detected position of the second image in the first image and the detected posture of the second image in the first image,
wherein the image pickup device displays a virtual image corresponding to the second image based on the third information.

* * * * *